United States Patent [19]
Netter et al.

[11] Patent Number: 5,357,093
[45] Date of Patent: Oct. 18, 1994

[54] SYSTEM AND METHOD FOR CONVERTING BAR CODE SCAN LINE DATA INTO MACHINE-READABLE CODE

[75] Inventors: Cheryl E. Netter, Golden; Larry K. Carmichael, Westminster; David L. Trachy, Louisville; Frederick G. Munro; Robert W. Schmidt, both of Broomfield, all of Colo.

[73] Assignee: Storage Technology Corporation, Louisville, Colo.

[21] Appl. No.: 11,862

[22] Filed: Feb. 1, 1993

[51] Int. Cl.⁵ ............................................. G06K 7/10
[52] U.S. Cl. .................................... 235/462; 235/463; 235/470
[58] Field of Search .................. 235/462, 463, 470

[56] References Cited
U.S. PATENT DOCUMENTS

| | | | |
|---|---|---|---|
| 4,973,829 | 11/1990 | Ishida | 235/462 |
| 5,045,677 | 9/1991 | Okamura | 235/470 |
| 5,052,044 | 9/1991 | Gaborski | 235/462 |
| 5,073,954 | 12/1991 | Van Tyne | 235/462 |
| 5,134,272 | 7/1992 | Tsuchiya et al. | |
| 5,155,343 | 10/1992 | Chandler | 235/462 |

*Primary Examiner*—Harold Pitts
*Attorney, Agent, or Firm*—Sterne, Kessler, Goldstein & Fox

[57] ABSTRACT

A bar code conversion system and method identifies good data in the scan data array and analyzes that data to generate machine-interpretable code. A vision system optically scans bar code labels and places the resulting digital camera data into a two dimensional line scan data array of pixels. A process_line function then searches the scan data array for three lines that intersect the initial bars and spaces of the bar code (called starting lines) and 3 lines that intersect the last bars and spaces (called ending lines). For each pair of starting and ending lines, a build_composite generates a composite line using pixels in positions between the first pixel of a starting line and the last pixel of a corresponding ending line. A run_length decode function is then invoked on each composite line to create a run length array of width values, each of which indicates the width (in pixels) of a bar or space of the bar code. Using statistical analysis, a convert_bars_and_spaces function converts the run length array to a bar and space array of binary width values. The three resulting bar and space arrays are synthesized by a vote_bars_and_spaces function. Finally, a build_bar_code function identifies machine-interpretable values (e.g., ASCII codes) represented by the width values in the synthesized bar and space array.

24 Claims, 29 Drawing Sheets

SYSTEM AND METHOD FOR CONVERTING BAR CODE SCAN LINE DATA INTO MACHINE-READABLE CODE

FIELD OF THE INVENTION

This invention relates generally to image signal processing apparatus and methods for processing an input image signal. In particular, the invention relates to an image signal processing apparatus and method for processing an image signal containing a bar code.

BACKGROUND OF THE INVENTION

A bar code is a specialized code used for fast identification of items with a bar code scanner. The bar code consists of a sequence of alternating bars and spaces, each of which is either wide or narrow. The bar and space widths represent one or more machine-interpretable values.

Bar codes are commonly encoded in a 3-of-9 encoding scheme. According to the 3-of-9 scheme, every bar code begins with a 9-bit sequence (the "start sequence") that represents a start character and ends with the same 9-bit sequence (the "end sequence") that represents an end character. Between the start and end sequences are 9-bit data sequences that represent ASCII characters.

The start and end characters of the bar code indicate the bar code's class, and the class indicates the order in which the ASCII characters are represented. Characters in a bar code of a first class are arranged from right to left. Characters in a second class are arranged left half before right half. For example, a second class bar code 012345 would be unscrambled to 345012. Characters in the third class are arranged from left to right. The 3-of-9 encoding is fully described in ANSI specification MH10.8M - 1983, which is incorporated herein by reference as if set forth in full below.

One use of bar codes is in a mass storage system for a computer system. A representative mass storage system is described in the U.S. Pat. No. 4,932,826. In that system, data cartridges are stored in hexagonal compartments in a honeycomb-like apparatus that includes mechanisms for fetching cartridges from the compartments, for reading and writing data on them, and for replacement of the cartridges in the compartments. Each data cartridge is labeled with a bar code for identification purposes.

There are several conventional approaches for converting scan data into machine-interpretable codes such as ASCII, but each has deficiencies when used in the mass storage system. In one conversion approach, all or nearly all of the scan data are analyzed. For example, point of sale (POS) terminals commonly employ this approach in interpreting universal product codes. While the time required to perform such an analysis would not likely slow an operator of the POS terminal, it would substantially degrade the performance of the mass storage system.

A second conversion approach analyzes a single horizontal line of the scan data array. Doing so requires very little computation time but only produces accurate results if the line analyzed intersects every bar and space of the bar code. As with the UPC label, the cartridge bar code label may be tilted or partially obscured, making it difficult or impossible to identity such a line. And such a line is especially rare in cartridge bar code scan dam, as cartridge bar codes generally have large numbers of bars and spaces (so as to unambiguously identify a large number of cartridges), and the bars and spaces are relatively short (so as to fit on the cartridges).

Therefore, what is needed is a bar code scan conversion technique that generates machine-interpretable code quickly and accurately even if the scan data array has no line which intersects every bar and space.

SUMMARY OF THE INVENTION

Accordingly, the present invention is directed toward a bar code conversion system and method that identifies good data in the scan data army and analyzes the good data to generate machine-interpretable code.

A vision system optically scans bar code labels and places the resulting digital camera data into a two dimensional line scan data array of pixels. The value of each pixel represents black (i.e., a portion of a bar) or white (i.e., a portion of a space).

A process-line function then searches the scan data array for three lines that intersect the first bars and spaces of the bar code (called starting lines) and 3 lines that intersect the last bars and spaces (called ending lines). The process-line operates by searching a specified line in a specified direction for a specified sequence of pixels. Before searching a line, the function filters it by calling a one_bit_filter function to eliminate any single white pixel surrounded by black pixels and any single black pixel surrounded by white pixels.

To determine whether a line is a starting line, the process_line function searches the line from left to right for a sequence of pixels that represents a valid start character. The location of the sequence within the starting line is called a start_location. Similarly, the function determines whether a line is an ending line by searching it from right to left for a sequence of pixels that represents a valid end character. The location of the sequence within the ending line is called an end_location.

A build_composite function then builds a composite line from each pair of starting and ending lines. For each composite line, this function sets the first position to the value in the start_location of a starting line, the last position to the value in the end_location of an ending line, and the remaining values to the values in positions that are (roughly) in a line between the start and end positions.

Each composite line is filtered with the one_bit_filter function. A run_length decode function is then invoked on each filtered composite line to create a run length array of width values, each of which indicates the width of a run of like-valued pixels. Any width smaller than a specified amount is considered an error and is thus filtered from the bar and space array by a run_length filter function. A width_threshold function then statistically analyzes the width values of each run length array to determine minimum and maximum narrow width thresholds and minimum and maximum wide width thresholds. Based on these thresholds, a convert_bars_and_spaces function converts each run length array to a bar and space array, each value of which is either narrow or wide.

The three resulting bar and space arrays are synthesized by a vote_bars_and_spaces function. For each bar and space array position, this function compares the three corresponding values. If at least two of the three values of a position are the same, the function inserts that value into an output bar and space array.

A build_bar_code function then identifies machine-interpretable values (e.g., ASCII codes) represented by the width values in the output bar and space array. Finally, an unscramble_label function unscrambles the values according to the class of the bar code (as indicated by the start and end characters).

DETAILED DESCRIPTION OF THE INVENTION

1. High Level Structure and Operation

The present invention is directed toward a system and method for converting bar codes to machine-interpretable codes. A typical use of the invention is within a mass storage system such as the 4400 Automated Cartridge System (ACS) manufactured by Storage Technology Corporation of Louisville, Colo. and such as that described in co-pending U.S. patent application Ser. No. 07/877,321. That co-pending application is hereby incorporated by reference as though fully set forth herein.

Figure 1:
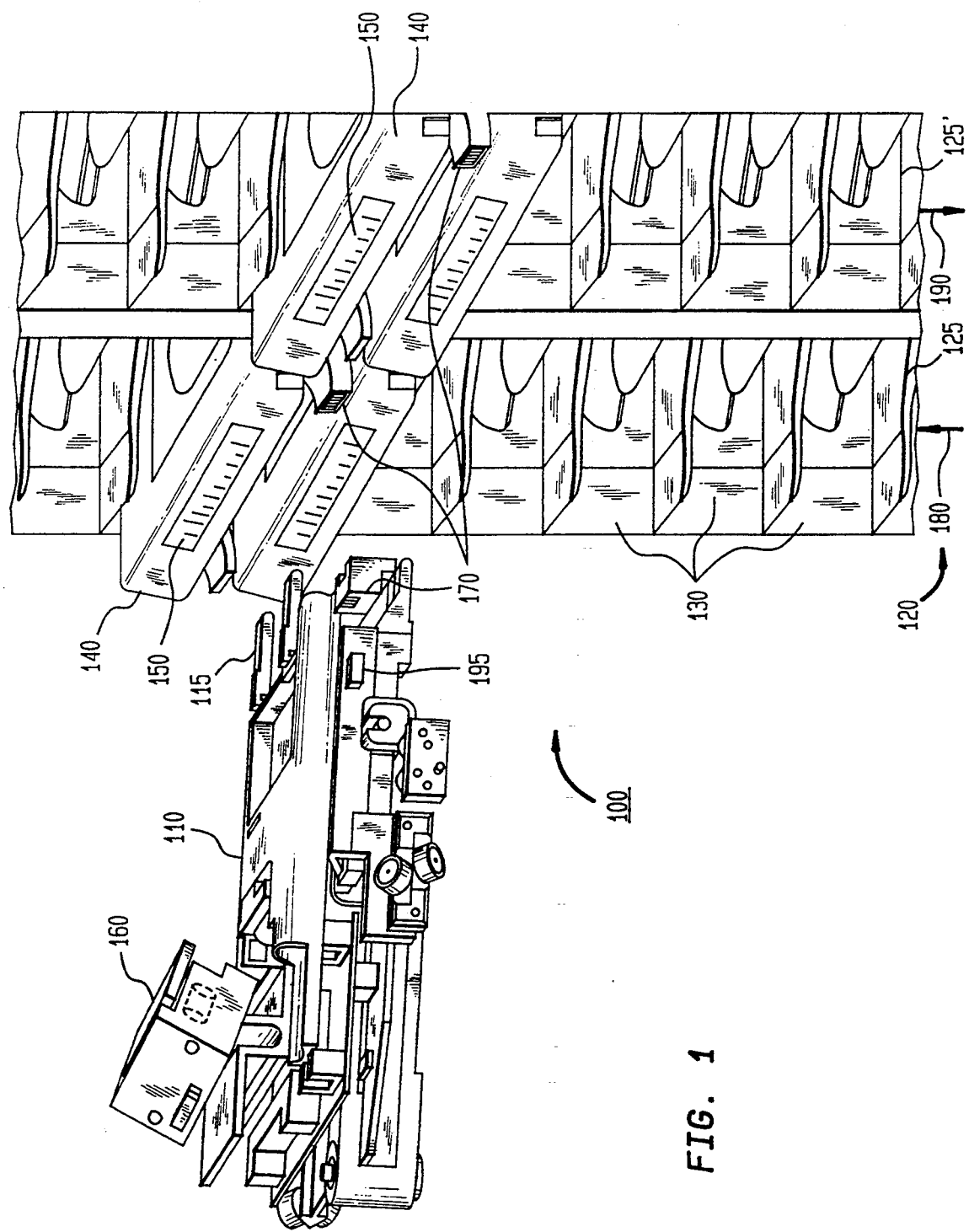
FIG. 1 shows a perspective view of a segment of a mass storage system.

FIG. 1 shows a perspective view of a segment of a mass storage system 100. The mass storage system 100 includes one or more cylindrical arrays 120 of tape cartridge storage cells 130 and a robotic arm 110. The cells 130 are arranged in columns 125, 125'. Tapes or other type of media cartridges 140 are stored in the cells 130.

The robotic arm 110 retrieves the media cartridges 140 from the cells 130 and places them in a cartridge reader that can access the data stored thereon. The robotic arm 110 is pivotally rotatable about each array 120 and contains a tape cartridge retrieval mechanism 115 and a vision system. In a preferred embodiment of the preferred invention, the vision system is a video line scan camera 160. The video line scan camera 160 is used to read bar code labels 150 placed upon each cartridge 140.

Figure 2:
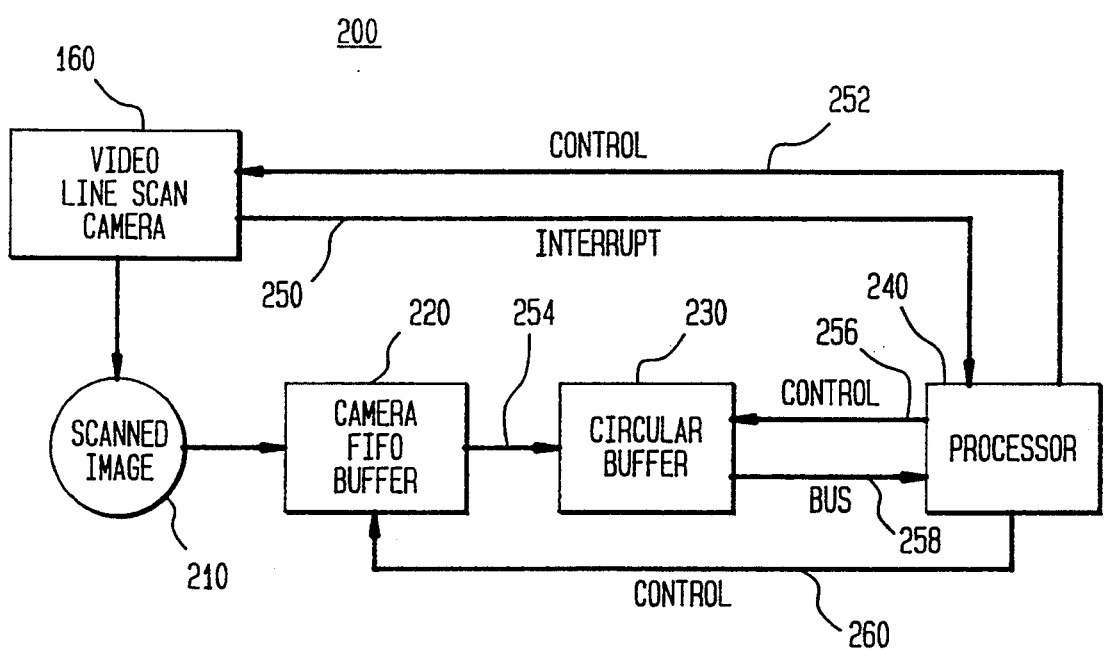
FIG. 2 shows a functional block diagram of a scanned image capturing system of the mass storage system of FIG. 1.

FIG. 2 shows a functional block diagram of a scanned image capturing system 200 of the mass storage system 100. The line scan camera 160 captures a scanned image 210 (i.e., a horizontal line of a bar code) as a 1×n array of pixels. Resolution of the line scan camera 160 is preferably 2048 pixels per line, and thus n is preferably 2048. Each time it captures a scan line, the line scan camera 160 stores a 1×2048 array in a first in, first out (FIFO) buffer 220.

Figure 19A:
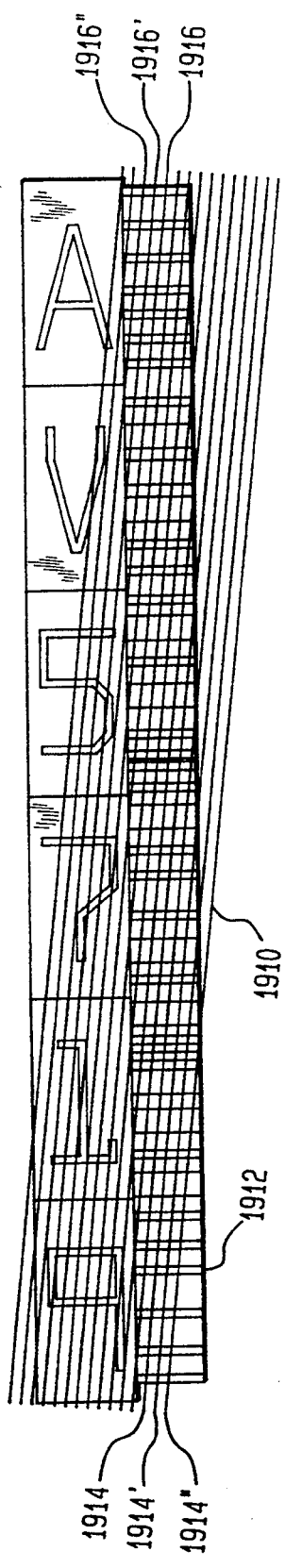
FIGS. 19A, 19B, 19C and 19D show the processing of line scan data by the process_bar_code function of FIG. 3.

Once the line scan camera 160 captures an entire bar code (with 25 scan lines, in a preferred embodiment), it sends a "scan complete" signal to a processor 240 via an interrupt line 250. The processor 240 then initiates (via a control line 260) a transfer of the 25 scan lines from the FIFO buffer 220 to a circular buffer 230 via a bus 254. The scan lines of a single bar code are depicted in FIG. 19A as a line_scan_camera_data array 1910. A preferred circular buffer 230 stores up to ten line_scan_camera_data arrays 1910. The processor 240 requests line_scan_camera_data arrays 1910 (via a control line 256) from the circular buffer 230. The arrays are transferred via a bus 258.

FIGS. 19A-19D show the processing of the line_scan_camera_data array 1910 by a bar code conversion system 300 (shown in FIG. 3) executing on the processor 240 according to the present invention. First, looking at FIG. 19A, the bar code conversion system 300 receives the line_scan_camera_data array 1910 for a bar code 1912. (For clarity, the line_scan_camera_data array 1910 is shown with less than 25 lines.) As commonly happens, the scan lines of the line_scan_camera_data array 1910 intersect the bar code 1912 at an angle. Consequently, no single scan line intersects all of the bars and spaces.

The bar code conversion system 300 searches scan lines in a forward direction (i.e., from left to right) for a valid start sequence. Lines having a valid start sequence (referred to as starting lines 1914) must intersect the initial bars and spaces of the bar code 1912. The first pixel of the start sequence in each starting line 1914 is stored as the start position.

Once 3 starting lines 1914 are identified, the bar code conversion system 300 searches scan lines in a backward direction (i.e., from right to left) for a valid end sequence, which is generally the same as the start sequence. Lines having a valid end sequence (referred to as ending lines 1916) must intersect the last bars and spaces of the bar code 1912. The last pixel of the end sequence in each ending line 1916 is stored as the end position.

Figure 19B:
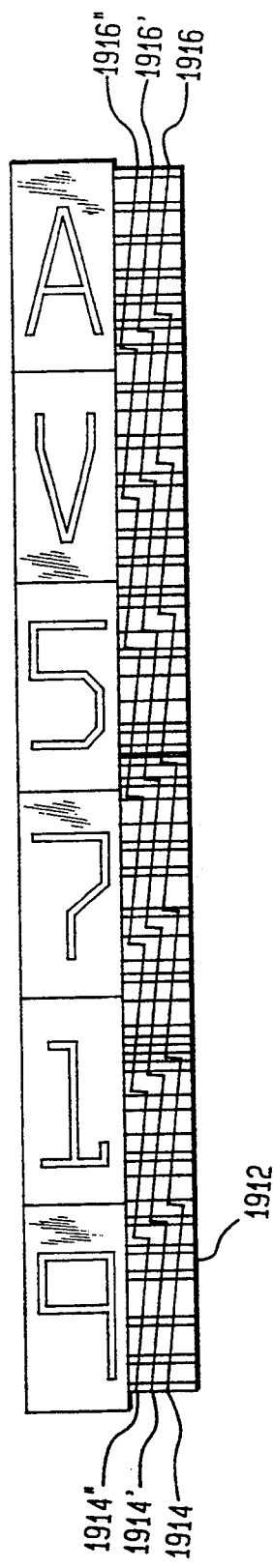
Figure 19C:
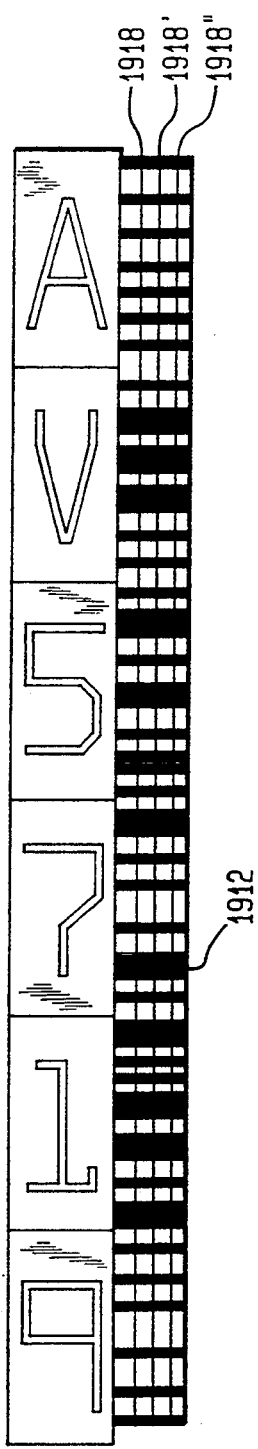

Once 3 ending lines 1916 are identified, the bar code conversion system 300 combines each starting line 1914 with an ending line 1916 (as shown in FIG. 19B) to generate composite lines 1918 (which are shown in FIG. 19C). Each composite line 1918 is made up of the pixels of the line_scan_camera_data 1910 that fall approximately in a line between the starting position of the starting line 1914 and the ending position of the ending line 1916. As FIG. 19C illustrates, the composite lines 1918 represent scan lines that run perpendicular to the bar code 1912 and thus intersect all of the bars and spaces.

Figure 19D:
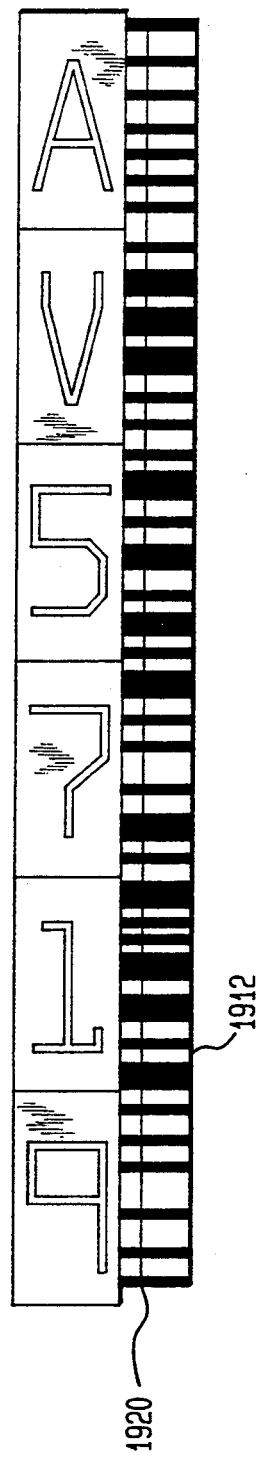

The bar code conversion system 300 then converts each composite line 1918 into a bar and space array of binary width values (narrow or wide). Each width value represents the width of a bar or space of the bar code 1912. The 3 bar and space arrays are then combined to form a synthesized bar and space array 1920, which is depicted in FIG. 19D. Finally, the bar code conversion system 300 decodes the synthesized bar and space array 1920 into a machine-readable code such as ASCII.

Figure 3:
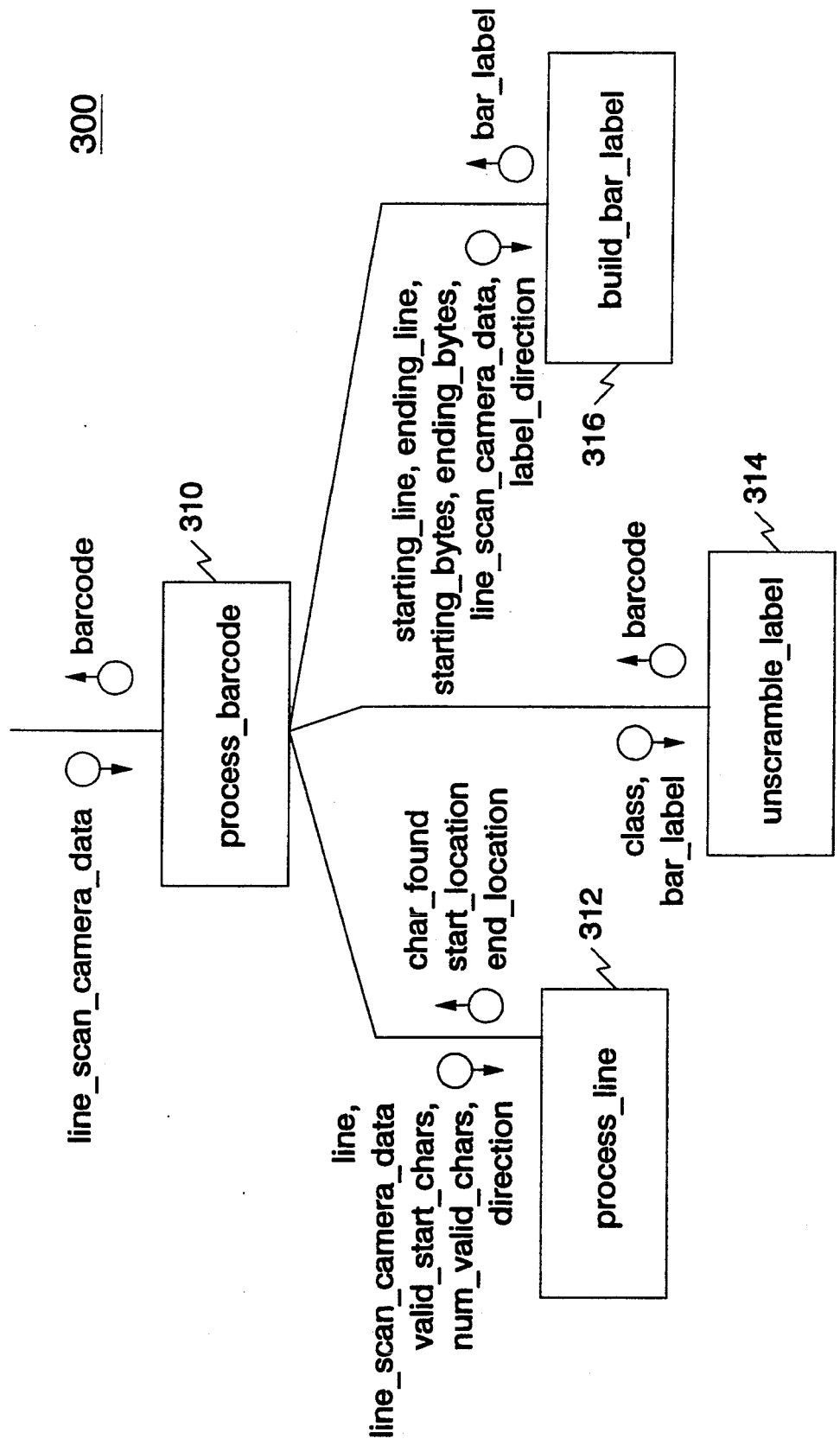
FIG. 3 shows a high level structure chart of a process_bar_code function that converts line scan data generated by the scanned image capturing system of FIG. 2 to a machine-readable code.

FIG. 3 shows a high level structure chart of a bar code conversion system 300 that the processor 240 executes to convert each line_scan_camera_data array 1910 to a machine-readable code such as ASCII. A preferred implementation of the system is in the C programming language.

Referring to FIG. 3, the main routine of the bar code conversion system 300 is a process_bar_code function 310. The input parameter to the function is a pointer to the line_scan_camera_data array 1910 ("line_scan_camera_data"). The output parameter is a structure called "bar code" that includes an array of the ASCII characters. The process_bar_code function 310 calls a process_line function 312, an unscramble_label function 314 and a build_bar_label function 316.

The process_bar_code function 310 invokes the process_line function 312 to search the scan data array for 3 starting lines 1914 and 3 ending lines 1916. The process_line function operates by searching a specified line forward (for starting lines 1914) or backward (for ending lines 1916) for a sequence of pixels that represents a start or end character. Input parameters to the function 312 are a pointer to the line_scan_camera_data array 1910, the line of the array to be processed ("line"), a set of all valid start and end characters ("valid_start_characters"), the number of valid start and end characters ("num_valid_chars") and the direction in which to search for the start or end character ("direction"). The output parameters are the position in the valid_start_characters structure of the character found ("char_found") and the positions in the line of the beginning and end of the sequence of pixels that represents the start or end character ("start_location" and "end_location").

The process_bar_code function 310 invokes the build_bar_label function 316 to build an array of characters ("bar_label") from the three starting lines 1914 and the three ending lines 1916. Input parameters to the function 316 are the three starting lines 1914 ("starting_lines"), the three ending lines 1916 ("ending_lines"), the starting location for each start character (starting_bytes"), the ending location for each end character ("ending_bytes"), a pointer to line_scan_camera_data, and the direction in which the characters appear in the bar code 1912 ("label_direction"). The label_direction is backward if the bar code 1912 is of the first class and forward otherwise. The output parameter is bar_label.

The process_bar_code function 310 invokes the unscramble_label function 314 to unscramble the characters in a bar label generated by the build_bar_label function 316. Input parameters to the function 314 are bar_label and the class of the bar label. The output parameter is the unscrambled bar label ("bar code").

The four main functions 310, 312, 314 and 316 of the bar code conversion system 300, as well as the functions they call, are described in detail below.

2. Process_Bar_Code Function

Figure 4A:
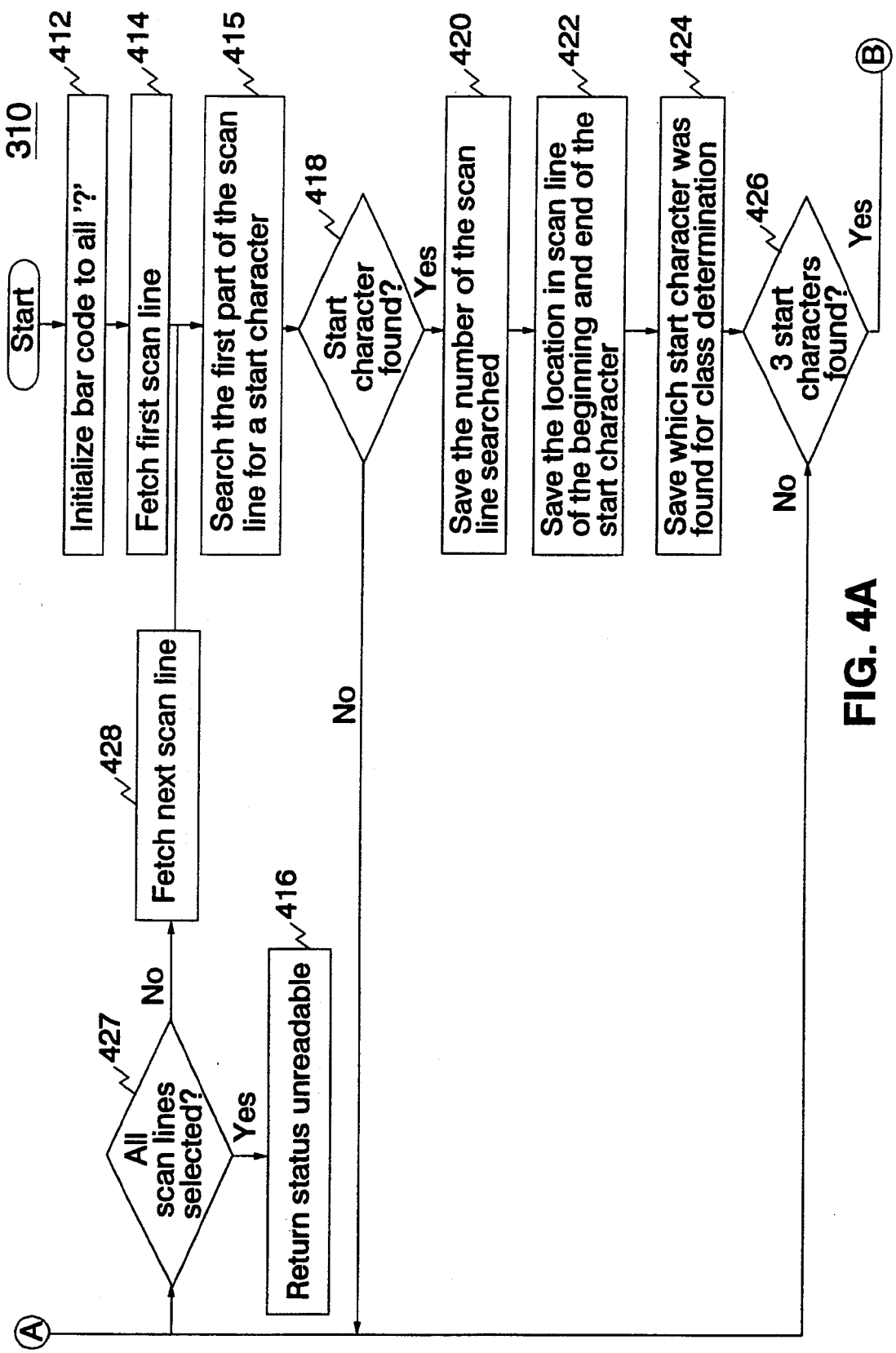
FIGS. 4A, 4B and 4C show a flowchart of the operation of the process_bar_code function of FIG. 3.
Figure 4B:
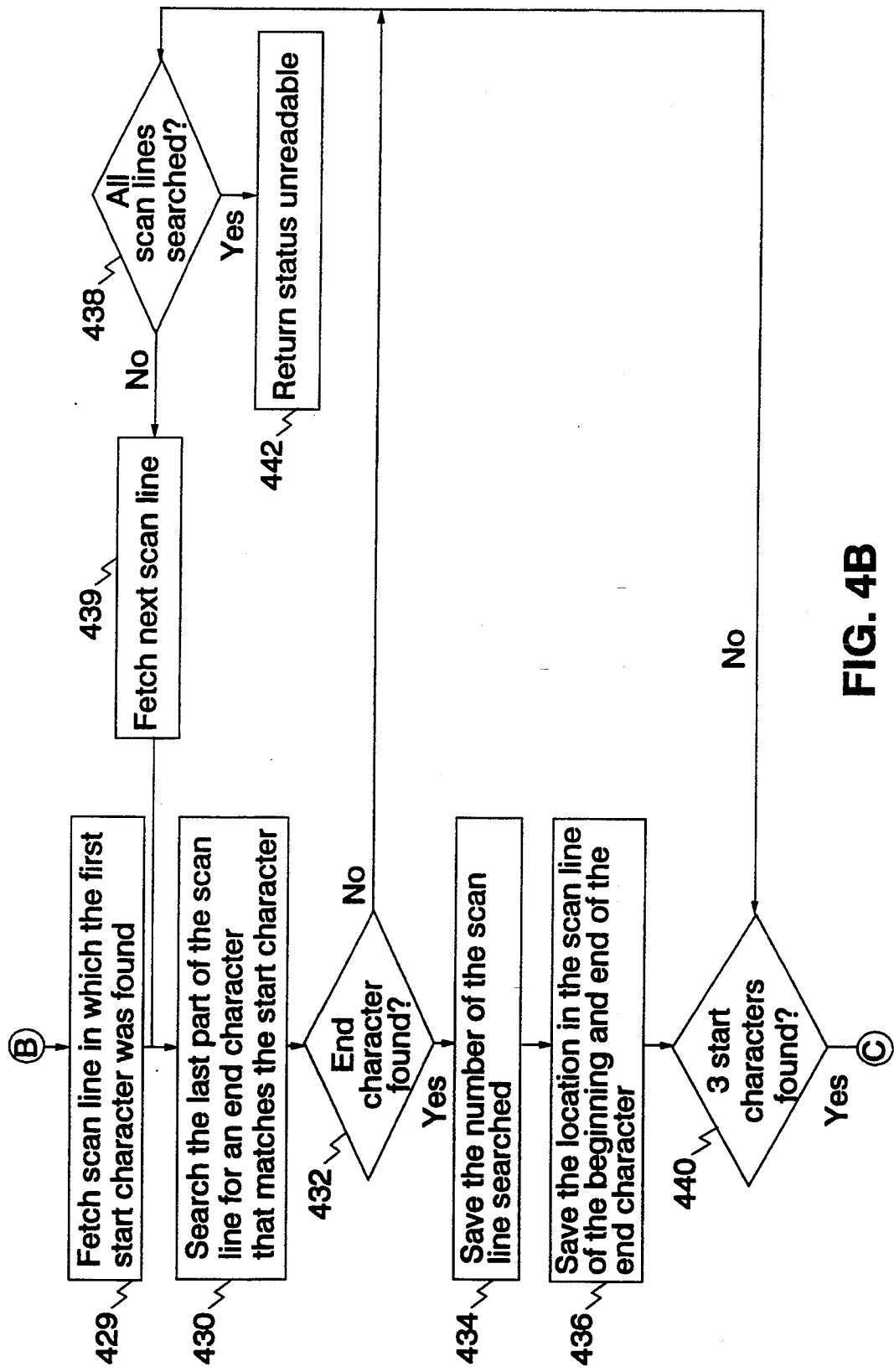
Figure 4C:
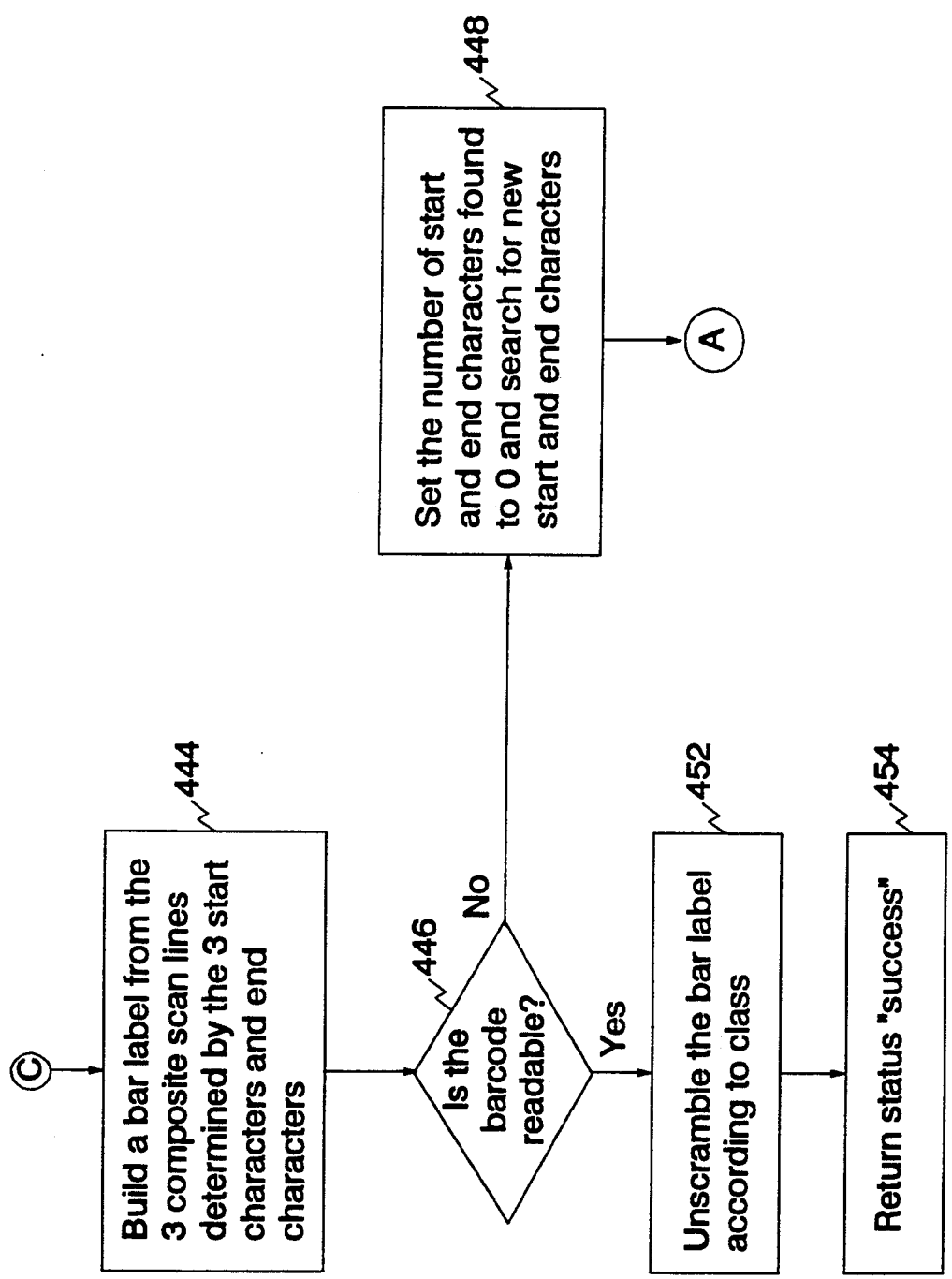

FIGS. 4A, 4B and 4C show a flowchart of the operation of the process_bar_code function 310. The function begins by initializing bar code to all question marks (see step 412). Throughout the bar code conversion system 300, the question mark represents an unrecognized character. The function then searches for a start character in three lines of the scan data as follows. First, the module fetches the first line of line_scan_camera_data (see step 414). It then invokes the process_line function 312 to search this line from left to right for a start character (see step 415).

If a valid start character is found (see step 418), then the process_bar_code function 310 stores the number of the current scan line (see step 420), the locations in that line where the start character begins and ends (see step 422) and the start character itself (see step 424). It then determines whether the start character has been found in three scan lines (see step 426). If not, and if there are scan lines which have not been searched for the start character (see step 427), then the function fetches the next scan line (see step and repeats steps 415–418.

If the start character has not been found in three scan lines (see step 426) and all scan lines have been searched for the start character (see step 427), then process_bar_code function 310 returns a status "unreadable" (see step 416).

Otherwise, once the start character has been found in three scan lines, the function searches for an end character in three scan lines as follows. First, it fetches the first of the three scan lines in which the start character was found (see step 429). The function then invokes the process_line function 312 to search the scan line from right to left for an end character (see step 430).

If the end character was found (see step 432), then process_bar_code function 310 stores the number of the current scan line (see step 434) and the locations in that line where the end character begins and ends (see step 436). It then determines whether the end character has been found in three scan lines (see step 426). If not, and if any scan line has not been searched for the end character (see step 438), then the function fetches the next scan line (see step 439) and repeats steps 430–440. Note that the scan line fetched in step 439 may not be one of the three in which the start character was found.

If three end characters have not been found (see step 440) and all three scan lines have been searched for the end character (see step 438), then process_bar_code function 310 returns a status "unreadable" (see step 442).

If, on the other hand, the end character is found in three scan lines (see step 440), then process_bar_code function 310 invokes the build_bar_label function 316 to construct the bar code 1912 from the scan lines in which the start and end characters were found (see step 444). If build_bar_label function 316 is unable to build a readable bar code 1912 (see step 446), then process_bar_code function 310 clears the variables in which it stored the start and end positions of the found character and searches other scan lines which contain start and end characters (see step 448). If build_bar_label function 316 returns a bar code, then process_bar_code function 310 next invokes the unscramble_label function 314 to unscramble the label (see step 452) and returns the status "success" (see step 454).

3. Process Line Function

A. Structure

Figure 5:
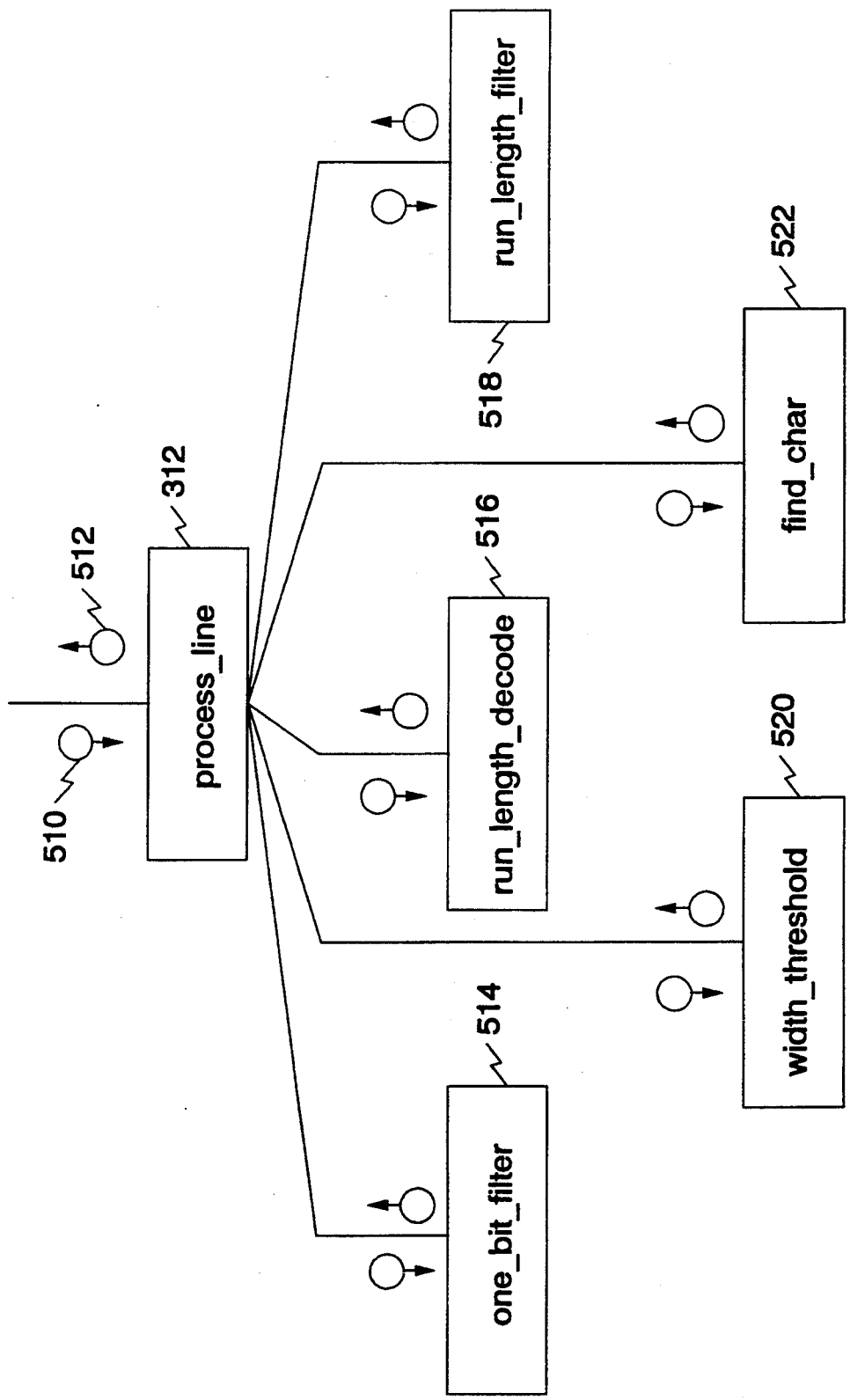
FIG. 5 shows a structure chart of a process_line function of the process_bar_code function of FIG. 3.

The process_line function 312 is called by the process_bar_code function 310 to locate start and end sequences in scan lines. FIG. 5 shows a structure chart of the process_line function 312. Referring to FIG. 5, the process_line function calls a one_bit_filter function 514, a run_length_decode function 516, a run_length_filter function 518, a width_threshold function 520 and a find_char function 522.

The process_line function 312 calls the one_bit_filter function 514 to remove one-pixel drop-ins and drop-outs from scan line data. A one-pixel drop-in is a white pixel surrounded by black pixels, and a one-pixel drop-out is a black pixel surrounded by white pixels. Input parameters to the function 514 are a pointer to a scan line data to be filtered ("line_scan_camera_data"), the number of bytes in the scan line data ("scan_length") and the value of the pixel preceding the line scan data ("last_pixel"). The output parameter ("line_scan_out" or "filtered_scan") is the filtered scan line data. The one_bit_filter function 514 is described in detail below in the section "One_bit_filter Function".

The process_line function 312 then calls the run_length_decode function 516 to generate a run_length array of bar and space widths. Each element of the array represents the length of a sequence of consecutive white pixels (i.e., a space) or a sequence of consecutive black pixels (i.e., a bar) in the one-pixel filtered scan line data. The first value of run_length always represents a space. If the scan line data begins with a black pixel, the first integer in the corresponding run_length array is a zero. For example, assuming black pixels are represented by "1" and white pixels are represented by "0", the run_length values for the scan line 11110000011100 would be: 0, 4, 5, 3, and 2.

Input parameters to the run_length_decode function 516 are line_scan_out, scan_length and the number of bytes in run_length ("sizeof_run_length"). Output parameters are the run_length array ("run_length") and the number of values in the run_length array ("run_count"). The run_length_decode function 516 is described in detail below in the section "Run_length_decode Function".

Next, the process_line function calls the run_length_filter function 518 to eliminate from the run_length array drop-outs and drop-ins having a width of between two and an "error_width" number of pixels. An effective value of error_width is 3. The input parameter to the function 518 is the size of the drop-outs and drop-ins to be filtered (error_width). Output parameters are the filtered run_length array ("run_length") and the length of the filtered run_length array ("run_count"). The run_length_filter function 518 is described in detail below in the section "Run_length_filter Function".

The process_line function 312 then calls the width_threshold function 520 to determine the minimum and maximum thresholds for the wide and narrow bar and space widths ("min_narrow_bar", "max_narrow_bar", "min_wide_bar" and "max_wide_bar", respectively). Input parameters to the function 520 are run_length and run_count. Output parameters of the function are min_narrow_bar, max_narrow_bar, min_wide_bar and max_wide_bar. The width_threshold function 520 is described in detail below in the section "Width_threshold Function".

Finally, the process_line function 312 calls the find_char function 522 to search for a start or end sequence (which represents a start or end character) in the run_length array. Find_char function 522 receives as input parameters the set of valid start and end characters ("valid_start_chars"), run_length, run_count, the direction of the search ("direction"), min_narrow_bar, max_narrow_bar, min_wide_bar and max_wide_bar. The direction is forward (i.e., left to right) when searching for a star sequence and backward (i.e., right to left) otherwise. Output parameters of the function are an indication of the character found ("char_found"), the location in the scan line where the start or end sequence starts ("char_start") and the location in the scan data where the start or end sequence ends ("char_end"). The find char function 522 is described in detail in the section "Find_Char Function".

B. Operation

Figure 6A:
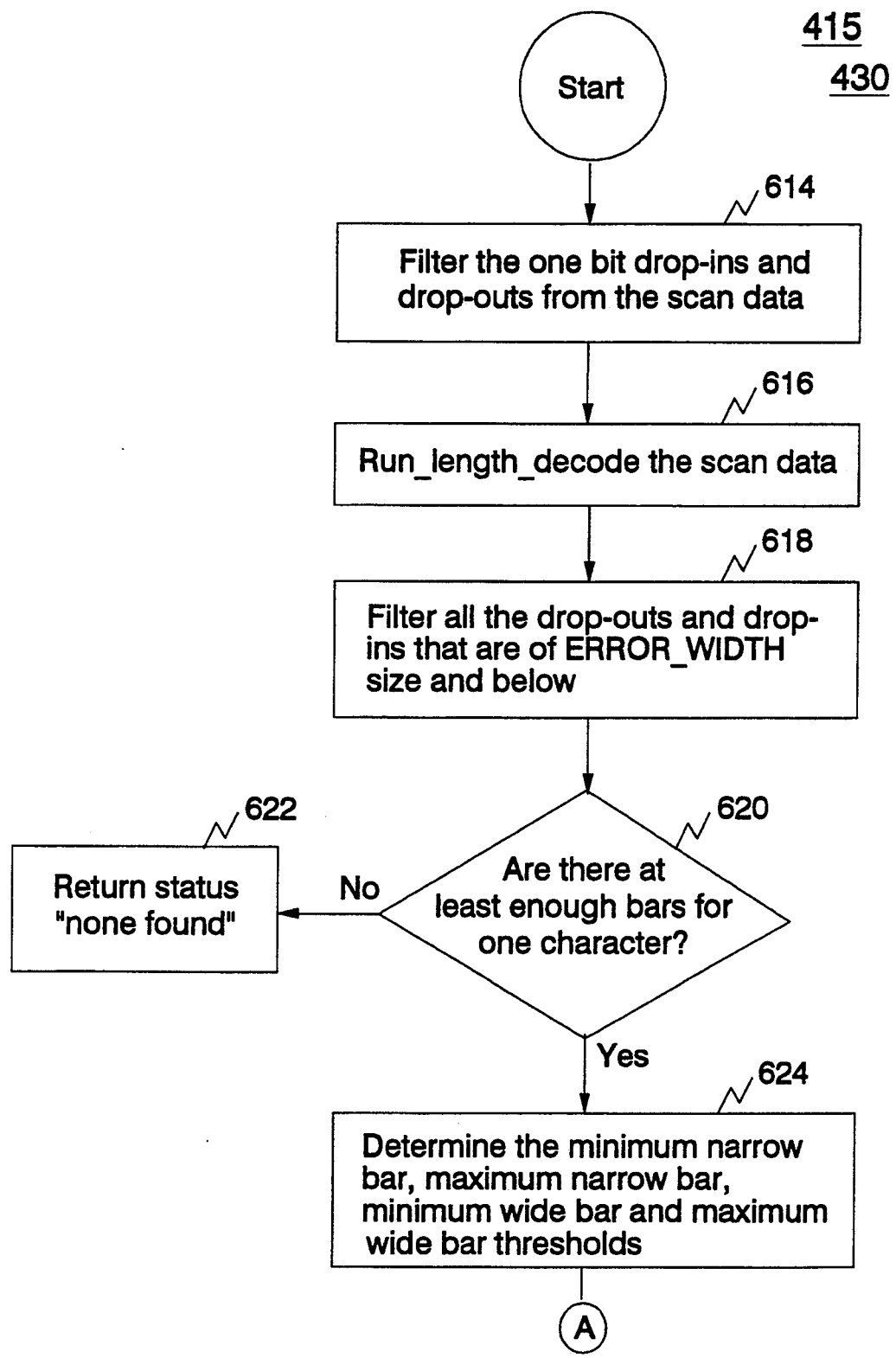
FIGS. 6A and 6B show a flowchart of the operation of the process_line function.
Figure 6B:
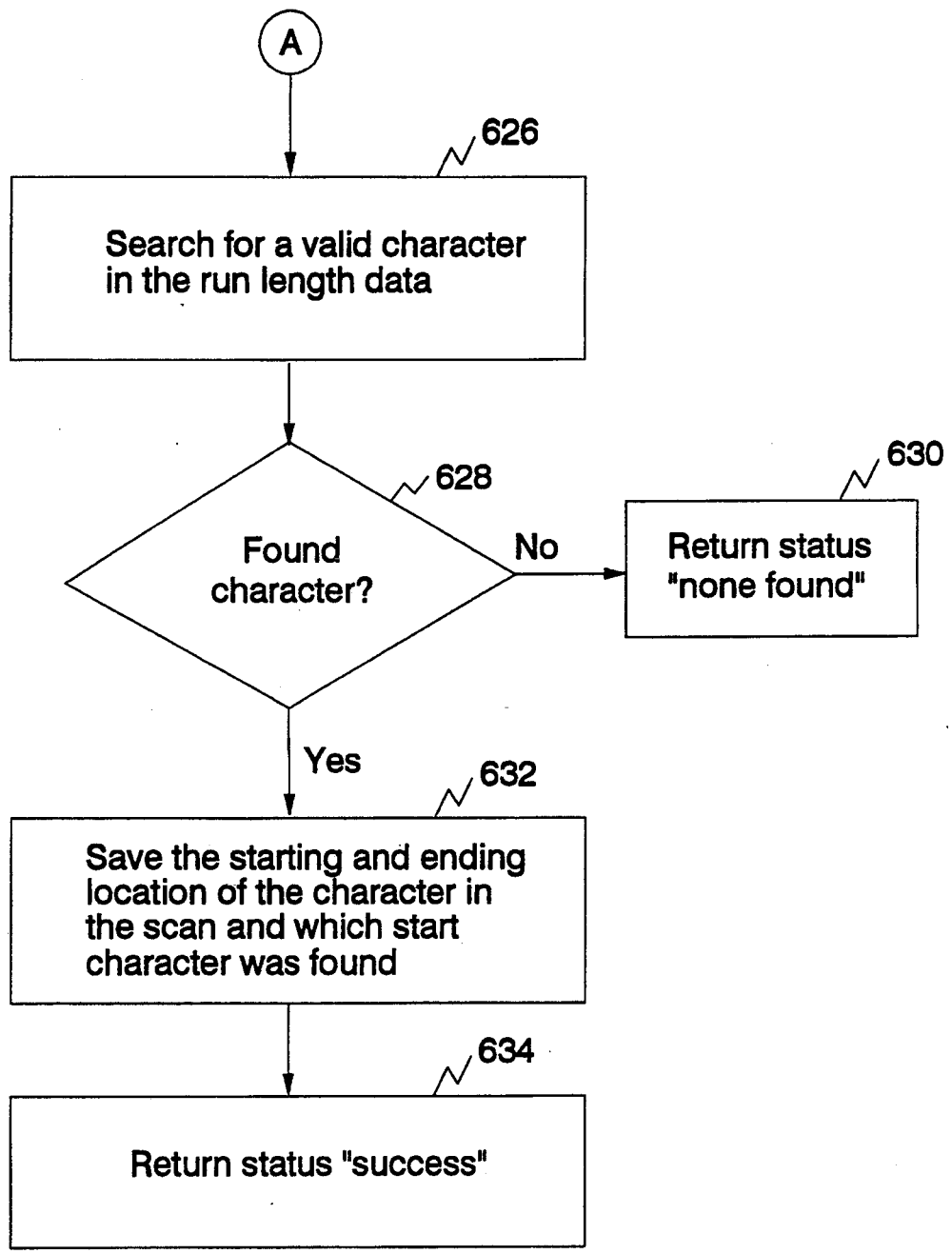

FIGS. 6A and 6B show a flowchart of the operation of the process_line function 312. The function searches a specified line of the line scan data ("line") in a specified direction for a sequence that represents a character in a specified set ("valid_start_characters") and returns the character represented by the sequence ("char_found") and the starting and ending position of the sequence in the line ("start_location" and "end_location").

The process_line function 312 first invokes the one_bit_filter function 514 to eliminate one-bit drop-ins and one-bit drop-outs from the scan line (see step 614). The function then invokes the run_length_decode function 516 to generate the run_length array from the filtered scan line (see step 616). Next, the run_length_filter function 518 is invoked to eliminate from the run_length array drop-outs and drop-ins that are between two and an error_width number of pixels in width (see step 618).

The process_line function 3 12 then compares the number of values in the run_length array to the number of bars and spaces required to represent a character (see step 620). If the number of values is too small to represent a character, then the function returns a status "none_found" (see step 622).

Otherwise, the process_line function 312 next invokes the width_threshold function 520 to determine the thresholds for narrow and wide bar and space widths (see step 624). Then, the find_char function 522 is invoked to search the run_length array forward for a start sequence or backward for an end sequence. Find_char function 522 uses the width thresholds to determine whether to characterize each value of run_length as wide or narrow.

If the start or end sequence was not found (see step 628), then process_line function 312 returns the status none_found (see step 630). Otherwise, the function saves the starting and ending positions of the start or end sequence as char_start and char_end, respectively, and the function saves an indication of the start or end character in char_found (see step 632). Finally, process_line function 312 returns a status "success" (see step 634).

4. Build_Bar_Label

A. Structure

Figure 7:
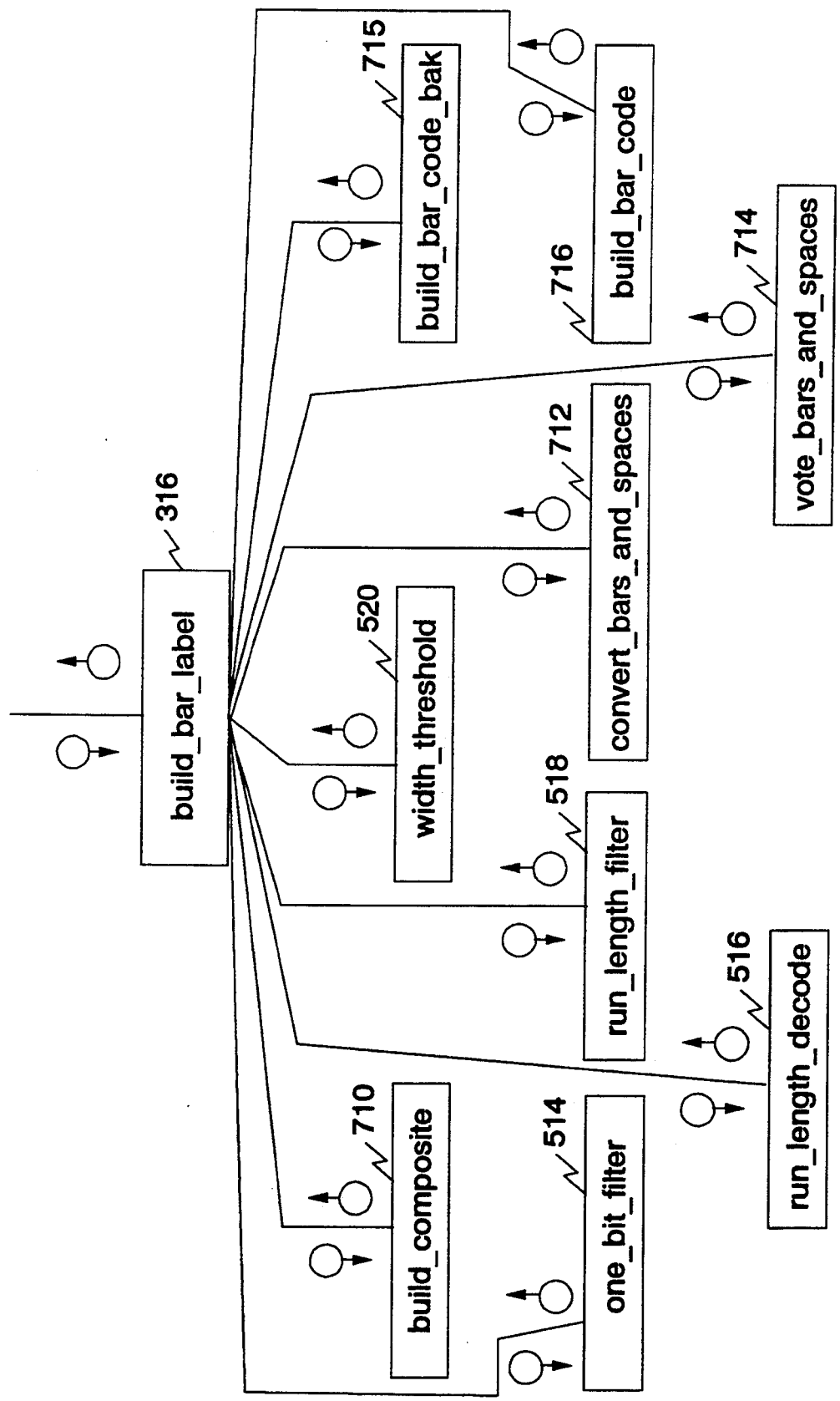
FIG. 7 shows a structure chart of a build_bar_label function of the process_bar_code function of FIG. 3.

The build_bar_label function 316 is called by the process_bar_code function 310 to translate scan data into the characters represented by the bar code 1912. FIG. 7 shows a structure chart of build_bar_label function 316. Referring to FIG. 7, build_bar_label function 316 calls the run_length_decode function 516, the width_threshold function 520, the one_bit_filter function 514, the run_length_filter function 518 of FIG. 5, as well as a build_composite function 710, a vote_bars_and_spaces function 714, a build_bar_code_bak function 715, a convert_bars_and_spaces function 712 and a build_bar_code function 716.

The build_bar_label function 316 calls the build_composite function 710 to build a composite scan line ("line_scan_in") from three lines of the line_scan_camera_data. Input parameters to the function 710 are line_scan_camera_data, the length of a scan ("length"), a scan line containing the start character ("starting_line"), a line containing the end character ("ending_line"), the position in which to start the composite line 1918 ("starting_byte") and the position in which to end the composite line 1918 ("ending_byte"). The output parameters are line_scan_in and the length of the composite scan ("scan_length").

The build_bar_label function 316 calls the convert_bars_and_spaces function 712 to build a bar and space array ("bars") of width values. Each width value is either narrow or wide, depending on the value of a corresponding bar and space width of the run_length array. Input parameters to the function 712 are run_length, the size of the bar and space array ("sizeof_bars"), the length of run_length ("run_count"), min_narrow_bar, max_narrow_bar, min_wide_bar and max_wide_bar. The output parameter of the function is the bar and space array ("bars").

The build_bar_label function 316 calls the vote_bars_and_spaces function 714 to compare corresponding elements of three bar and space arrays to generate a single output array. Input parameters to the function 714 are the three bar and space arrays (called "bars_1", "bars_2" and "bars_3"), the number of elements to compare ("length") and the processing direction ("direction"). If the processing direction is forward, the function aligns the corresponding characters beginning at the left end of the array. If the processing direction is backward, alignment is from the right end. The output parameter is the synthesized bar and space array ("new_bars").

The build_bar_label function 316 calls the build_bar_code function 716 to decode the bar and space array into an array of ASCII characters. Input parameters to the function 716 are new_bars, length, and the direction in which the bar code 1912 is encoded. The output parameter is an array of the decoded ASCII characters called "bar_label". Processing of the bars and space array is from left to right.

The build_bar_code_bak function 715 is the same as the build_bar_code function 716, except that it processes the bar and space array from right to left.

Each of the called functions (except the build_bar_code_bak function 715) is described in detail below.

B. Operation

Figure 8A:
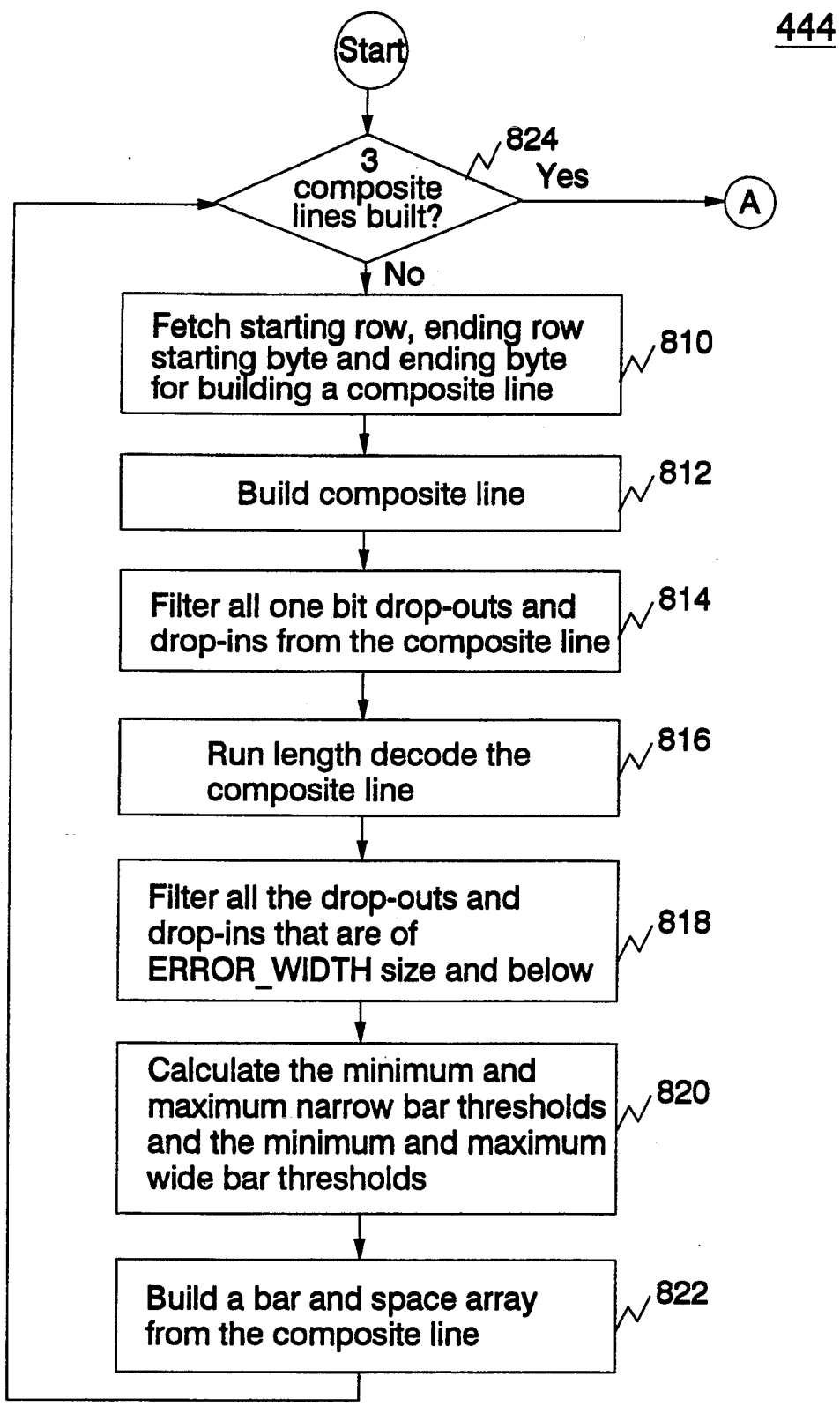
FIGS. 8A, 8B and 8C show a flowchart of the operation of a build_bar_label function of the process_bar_code function of FIG. 3.
Figure 8B:
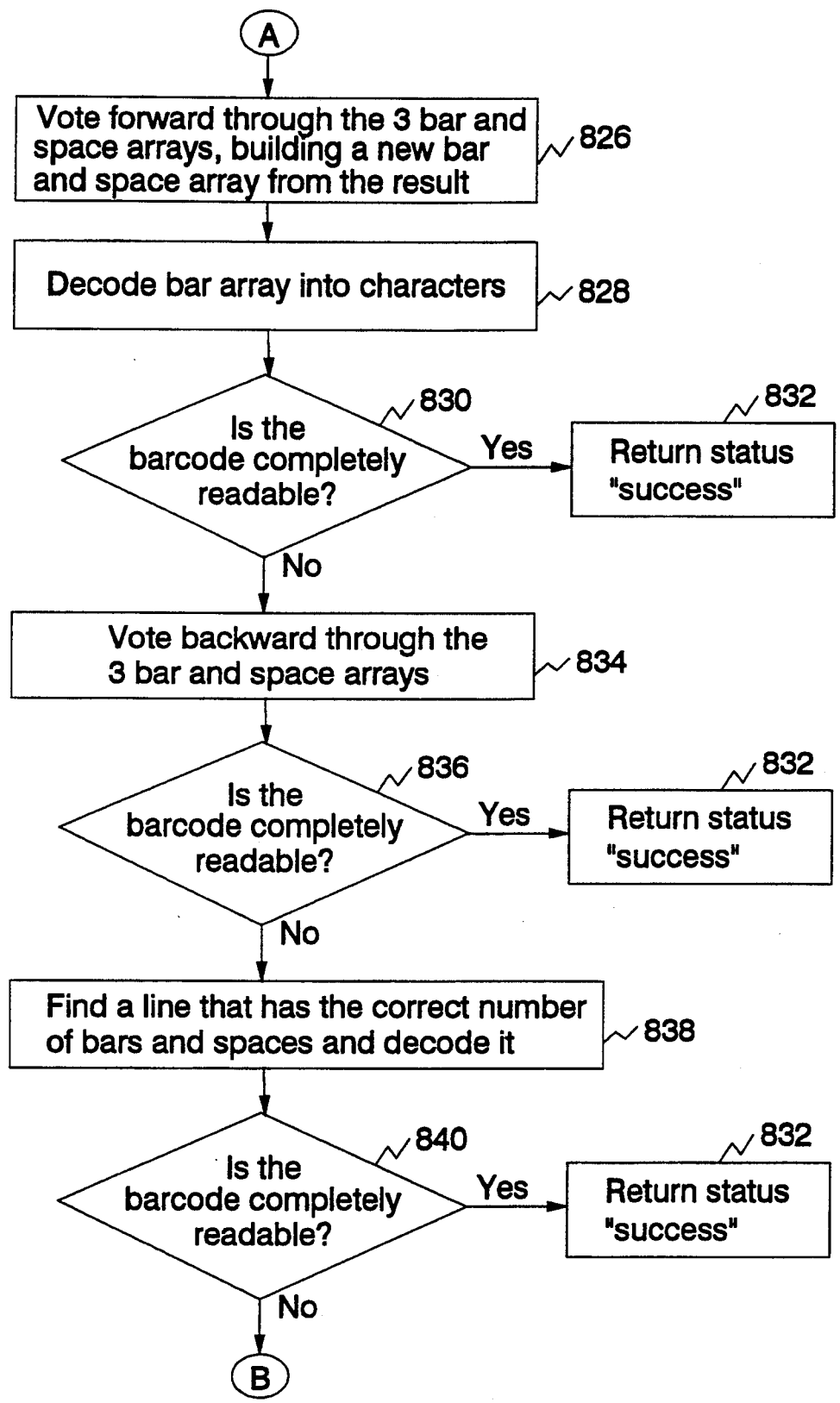
Figure 8C:
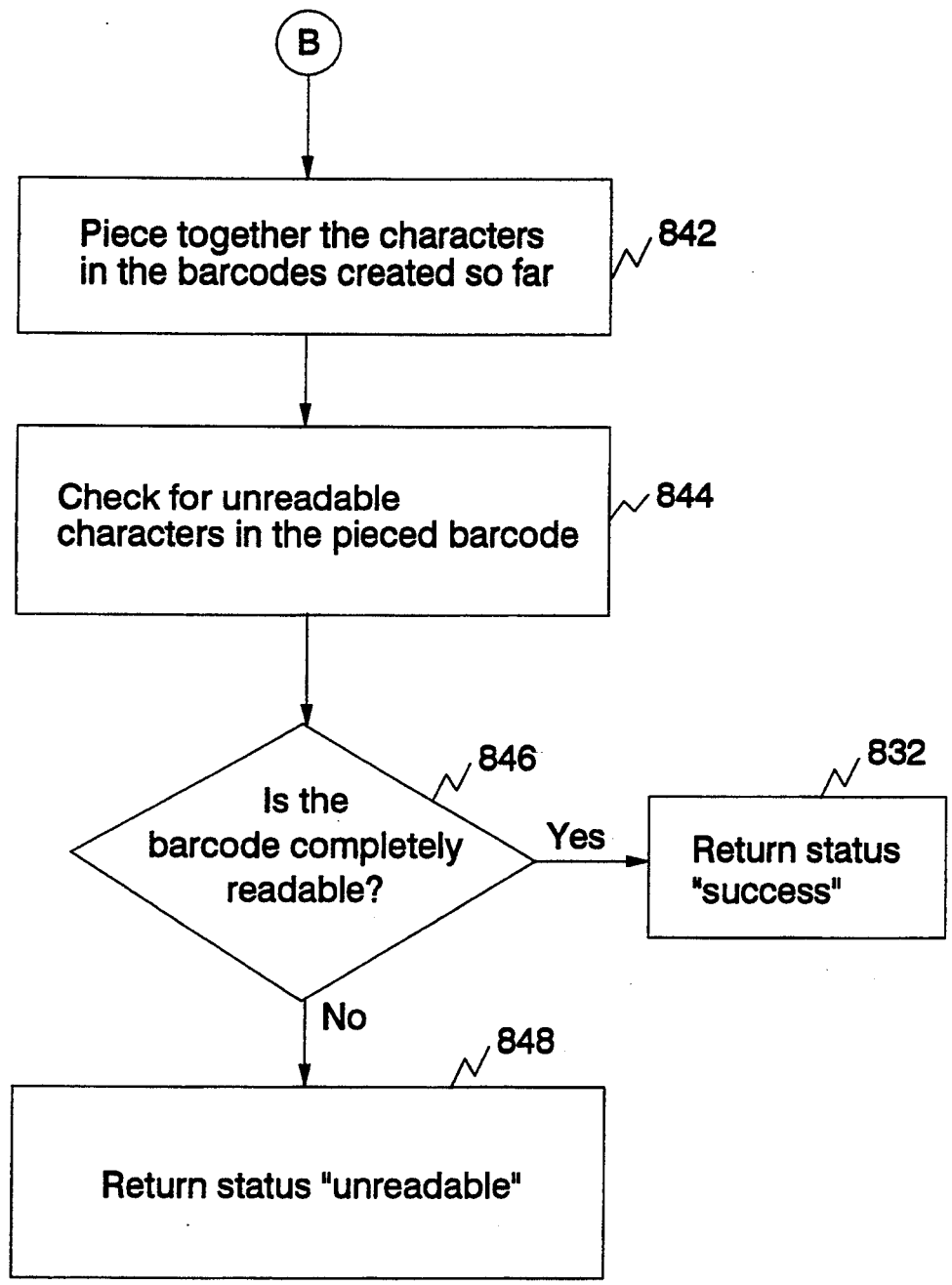

FIGS. 8A, 8B and 8C show a flowchart of the operation of the build_bar_label function 316. The function first invokes the function build_composite 710 to build a composite scan line ("line_scan_in") from three lines of the line_scan_camera_data as follows.

First, build_bar_label function 316 invokes one_bit_filter function 514 to eliminate one pixel drop-outs and drop-ins from a line of the line_scan_camera_data (see step 814). The filtered line is then converted from line scan data to run length data by calling the run_length_decode function 516 (see step 816). The run_length_filter function 518 is then called to eliminate drop-outs and drop-ins narrower than an error_width number (e.g., three) of pixels (see step 818). Next, build_bar_label function 316 invokes the width_threshold function 520 to determine the minimum and maximum thresholds for the widths of bars and spaces (see step 820). Finally, build_bar_label function 316 invokes the convert_bars_and_spaces function 712 to create a bar and space array from the run length data according to the width thresholds (see step 822). Steps 814-816 are repeated until three bar and space arrays have been built (see step 824).

The build_bar_label function 316 then invokes the vote_bars_and_spaces function 714 to vote across corresponding elements of the three bar and space arrays and thereby build a single composite bar and space array (see step 826). By "vote", it is meant to compare the data from the three arrays in a majority rules fashion. That is, if all three elements match, then the output of the comparison is the common value. Similarly, if two elements match and the common value is a valid character, then the common value is used as the output from the comparison. This is further explained below in the section entitled "13. Vote_Bars_And_Spaces Function." The vote_bars_and_spaces function 714 is called with a forward direction parameter, so alignment of corresponding elements is from left to right.

The build_bar_label function 316 then invokes the build_bar_code function 716, which analyzes the composite bar and space array (from left to right) into characters (see step 828). The results are stored in bar_label. If bar_label is completely readable (see step 830), the function build_bar_label function 316 returns a status "success" (see step 832).

Otherwise, the build_bar_label function 316 invokes the vote_bars_and_spaces function 714 with a backward direction parameter, so that alignment of the corresponding elements is from right to left (see step 834). The build_bar_code_bak function is then invoked to analyze the composite bar and space array (from right to left) and insert the resulting characters in bar_label (see step 828). If the bar code 1912 is now completely readable (see step 836), the function build bar label function 316 returns a status "success" (see step 832).

If, on the other hand, the bar code 1912 is still not completely readable (see step 836), then if one of the three bar and space arrays has the correct number of bars and spaces, that array is decoded by build_bar_code function 716 (see step 838). If the bar code 1912 is now completely readable (see step 840), the build_bar_label function 316 returns a status "success" (see step 832).

If a completely readable bar code 1912 still has not been built (see step 840), then the build_bar_label function 316 attempts to build a complete bar label from the three bar labels created in step 838. Specifically, the function searches each position of the three bar labels (generated from the three bar and space arrays) for a valid character and assigns the valid character to the bar_label array (see step 842). It then checks bar_label for invalid characters (see step 844). If any were found, the function returns the status "unreadable" (see step 848). Otherwise, the function returns the status "success" (see step 832).

5. Unscramble_Label Function

Figure 9:
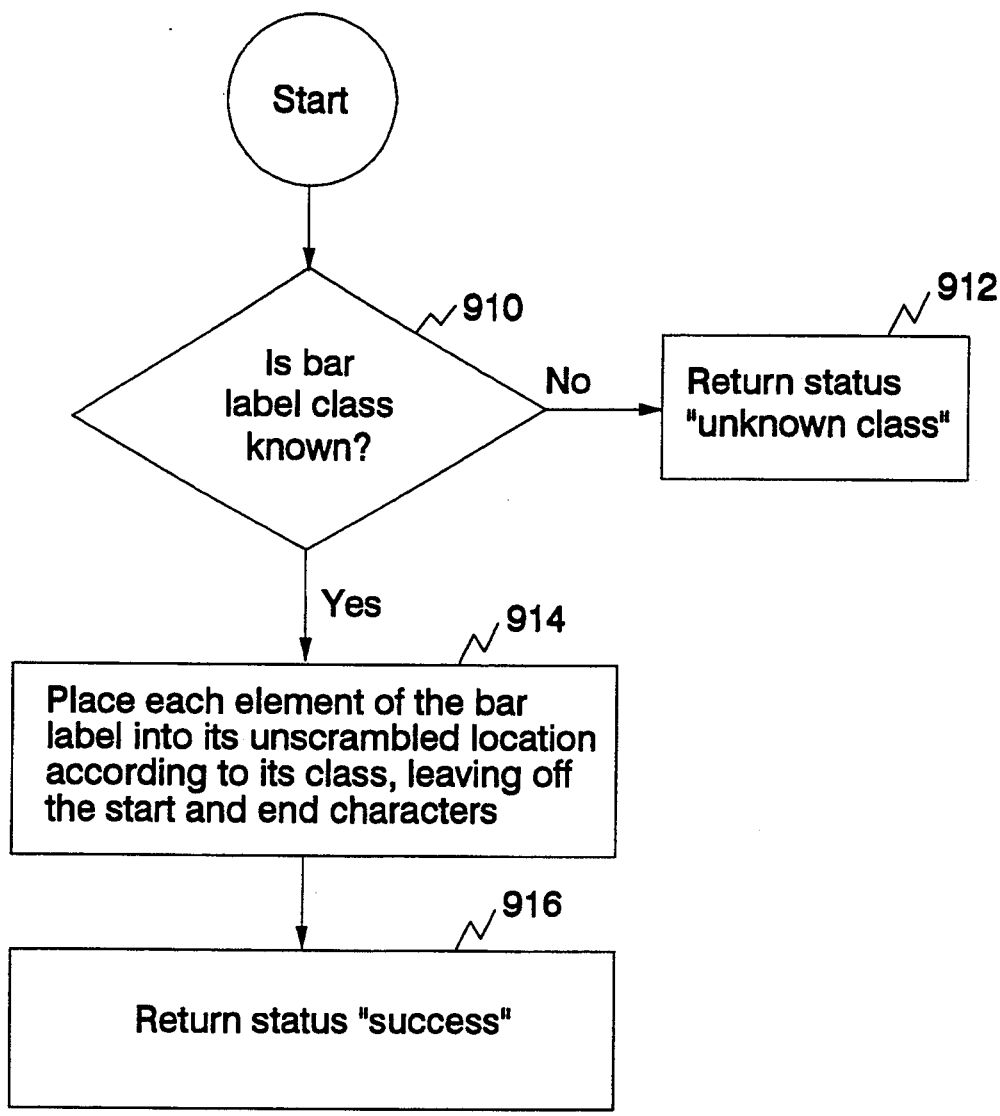
FIG. 9 shows a flowchart of a unscramble label function of the process_bar_code function of FIG. 3.

FIG. 9 shows a flowchart of the unscramble_label function 314. The unscramble_label function 314 attempts to unscramble the characters of the bar_label array generated by the build_bar_label function 316. Input parameters to the function 314 are bar_label and the class of the bar label. The output parameter is the unscrambled bar label ("bar code"). The function first determines if the start character, which indicates the label class or type of label, is recognized (see step 910). If not, then the function returns a status "unknown" (see step 912).

Otherwise, the unscramble_label function 314 arranges the elements of bar_label into their correct locations according to the class specified by the start and end character of the label (see step 914). Start and end characters are left off of the unscrambled label. To perform the unscrambling, the unscramble_label function 314 uses a 3×6 array, called "class_scram", which is defined as follows:

```
int class_scram[3][6] =
    /*  class 1   */
    {{ 5, 4, 3, 2, 1, 0},
    /*  class 2   */
    { 3, 4, 5, 0, 1, 2},
    /*  class 3   */
    { 0, 1, 2, 3, 4, 5}};
```

The following C code demonstrates how the unscramble_label function 314 uses class_scram to unscramble the label:

```
/*-------------------------------------------------
Place each element of the input bar label (bar_label) into its
unscrambled location in the output bar label (bar code). The output
bar code does not have start and stop characters. So skip over the start
character in bar_label and leave off the stop character.
-------------------------------------------------*/
for (count = 0; count < (BAR_LABEL_LENGTH); count++)
{
    bar code[class_scram[(UINT)class][count]] = bar_label[count
        + 1];
}
```

Once bar_label has been unscrambled, the function returns the status "success" (see step 916).

6. One_Bit_Filter Function

The one bit_filter_function 514 removes the one pixel drop-ins and drop-outs from line_scan_camera_data. Input parameters to the function 514 are a pointer to the line_scan_camera_data to be filtered ("line_scan_camera_data"), the length of line_scan_camera_data, and the value of the pixel preceding the line_scan_camera_data. The output parameter ("line_scan_out") is the filtered line_scan_camera_data.

Figure 10A:
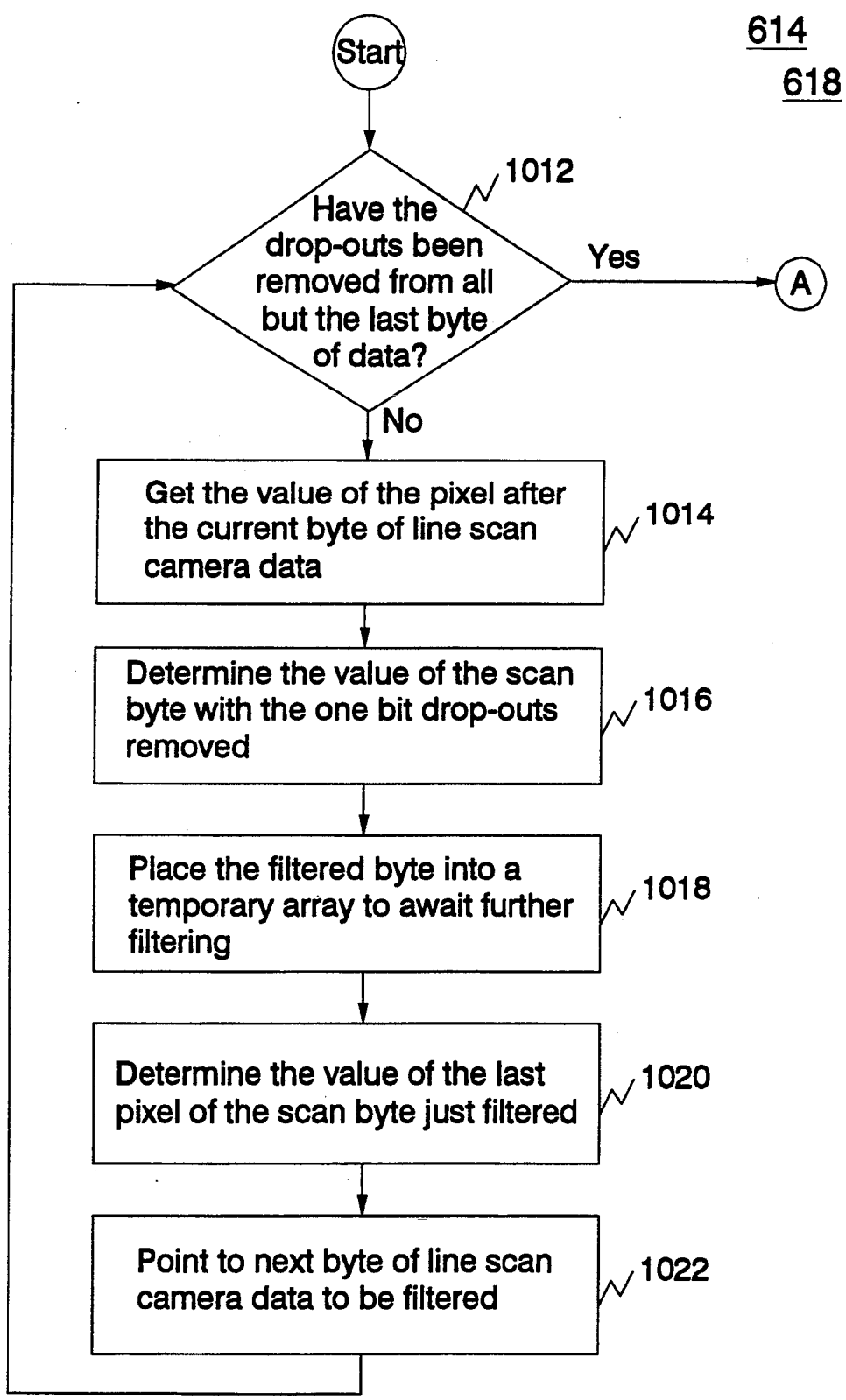
FIGS. 10A and 10B show a flowchart of the operation of the one_bit_filter function of the process_line function of FIG. 5.
Figure 10B:
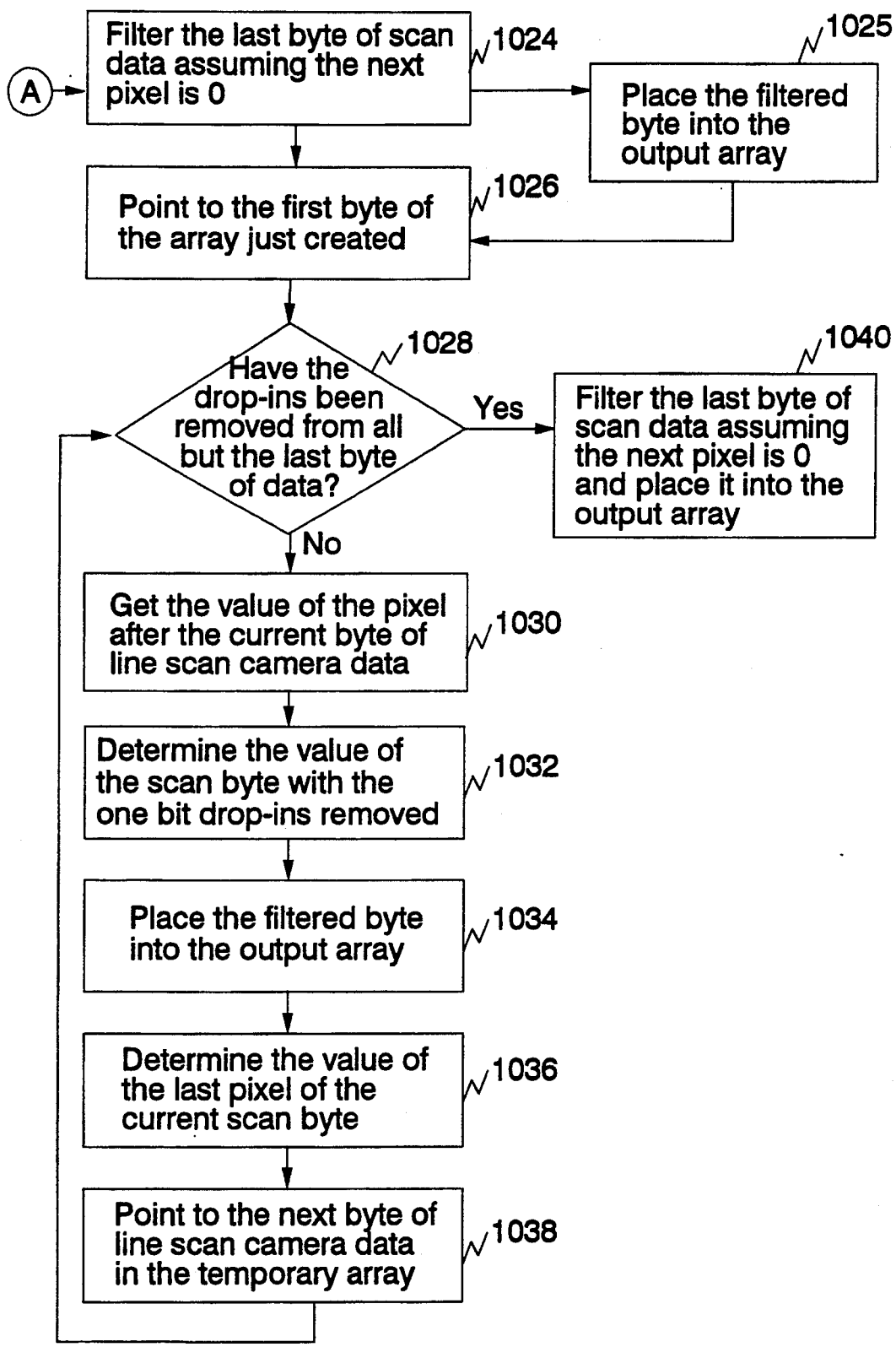

FIGS. 10A and 10B show a flowchart of the operation of the one_bit_filter function 514. Referring to FIGS. 10, the function first sets a variable called "last" to the value of the pixel preceding the line_scan_camera_data. This value is necessary to determine whether the first pixel of the first byte of the line_scan_camera_data is either a drop-in or a drop-out. The function then filters one-bit drop-outs from all but the last byte of line_scan_camera_data as follows.

First, the one_bit_filter function 514 determines the most significant bit of the next byte of line_scan_camera_data, i.e., the pixel that immediately follows the current byte (see step 1014). This value, called "next" is used to determine whether the last bit of the current byte of line_scan_camera_data is either a drop-out or a drop-in.

The function then filters one pixel drop-outs from the current byte of line_scan_camera_data (see step 1016). The filtering is performed by using "last", the current byte of line_scan_camera_data and "next" to index into a 3-dimensional array called one_bit_low_mask. Entries of the array are such that single bits of value 0 are mapped to the value 1. The filtered data is placed into the next byte of "temp_line_scan_out", a temporary buffer of partially scanned data (see step 1018).

Next, the one_bit_filter function 514 masks the current byte of line_scan_camera_data with 0×1 to determine the value of "last" for the next byte of line_scan_camera_data (see step 1020). Finally, a pointer is incremented to point to the next byte of line_scan_camera_data (see step 1022).

After filtering the one-bit drop-outs from all but the last byte of line_scan_camera_data (see step 1012), one_bit_filter function 514 removes one pixel drop-outs from the last byte by indexing into the one_bit_low_mask array with "last", the current byte of line_scan_camera_data and 0. (The pixel following the line_scan_camera_data is thus assumed to be 0.) (See step 1024). The filtered data is then copied into the last byte of temp_line_scan_out (see step 1025).

Next, the one_bit_filter function 514 resets a pointer to the first byte of temp_line_scan_out (see step 1026) and filters one pixel drop-ins from all but the last byte of line_scan_camera_data as follows.

First, the one_bit_filter function 514 determines the value of "next" as described above (see step 1030). The function then filters one pixel drop-ins from the current byte of temp_line_scan_out and places the filtered data into the next byte of line_scan_out (see step 1032). The filtering is performed by using "last", the current byte of temp_line_scan_out and "next" to index into a 3-dimensional array called one_bit_high_mask.

Entries of the array are such that single bits of value 1 are mapped to the value 0. The next value of "last" is then determined as explained above (see step 1036). Finally, the pointer is incremented to point to the next byte of temp_line_scan_out (see step 1038).

After filtering the one-bit drop-ins from all but the last byte of temp_line_scan_out (see step 1028), the one_bit_filter function 514 eliminates one pixel drop-ins from the last byte by indexing into the one_bit_high_mask array with "last", the current byte of temp_line_scan_out and 0. Finally, the filtered data is copied into the last byte of line_scan_out. (See step 1040).

7. Width_Threshold Function

The width_threshold function 520 determines the bar and space width thresholds. Input parameters to the function 520 are a pointer to the run_length data and the length of the run_length data. Output parameters of the function are min_narrow_bar, max_narrow_bar, min_wide_bar and max_wide_bar.

Figure 11A:
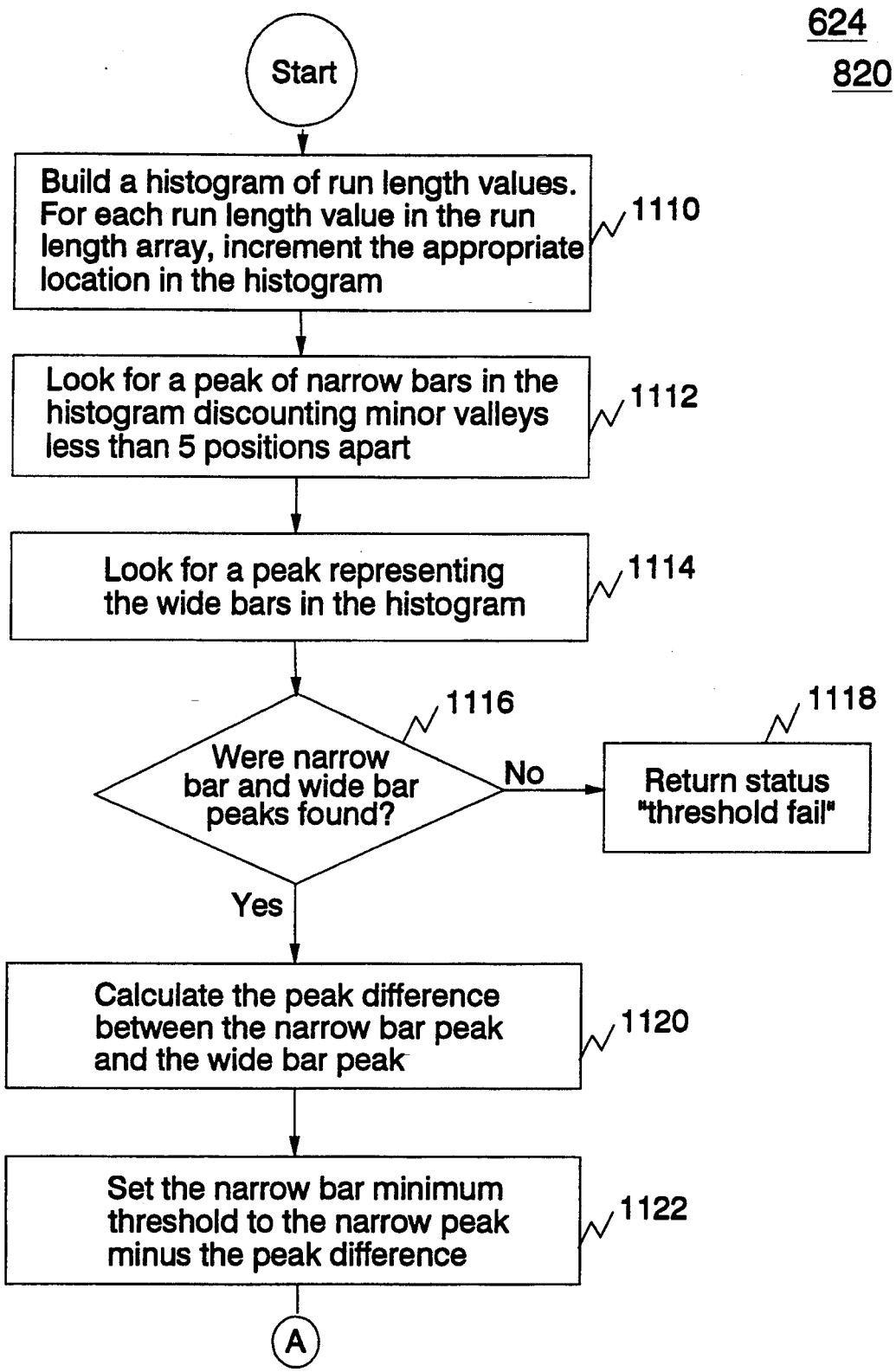
FIGS. 11A and 11B show a flowchart of the operation of a width_threshold function of the process_line function of FIG. 5.
Figure 11B:
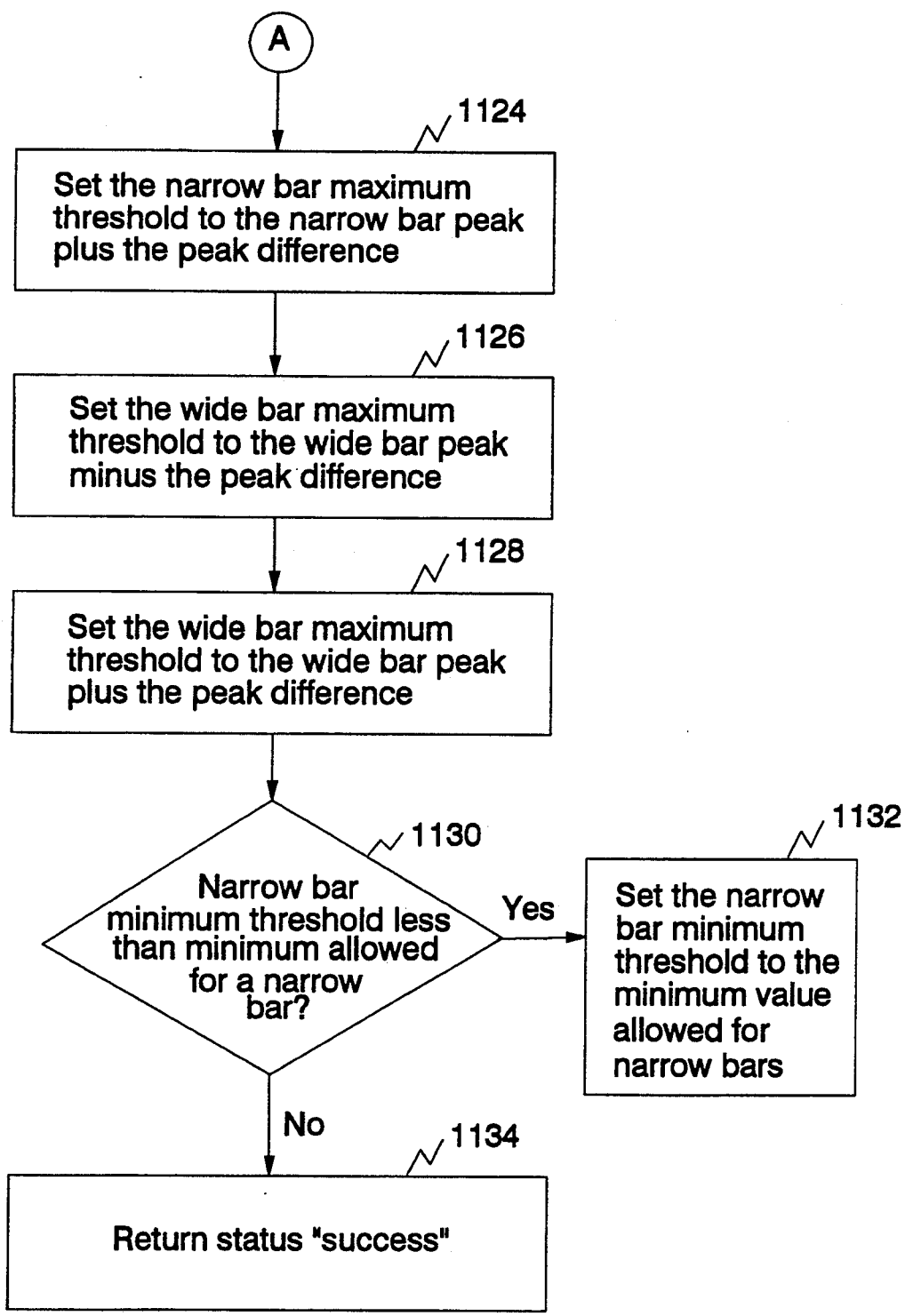

FIGS. 11A and 11B show a flowchart of the operation of function 520. The function first builds a histogram of run_length values (step 1110). The histogram is a one-dimensional array indexed by run_length values. For each run_length value in the run_length data, the width threshold function increments the value of the corresponding array element. Typically, the histogram will have two peaks—one for narrow bar and space widths and one for wide widths.

The width_threshold function 520 then searches the histogram for a peak of narrow widths (see step 1112). It does so by advancing a pointer past the histogram entries whose values are less than "MIN_BAR" (the minimum narrow width, e.g., 7 pixels), and then advancing a window of size "HIST_MOVING_AVERAGE" (e.g., 8 pixels) until detecting the peak of narrow widths. The window is bordered by the entry currently pointed to and the entry HIST_MOVING_AVERAGE positions past the position currently pointed to. Each time the window is advanced, the sum of the histogram values within it is calculated. Once the sum begins to decrease, the window is assumed to encompass the narrow width peak.

Accuracy is increased by requiring the sum to decrease for at least "BAR_GAP_SIZE" (e.g., 6) window positions. Imposing this requirement discounts minor valleys in the narrow width peak. The value of the histogram entry in the center of the window is saved as the narrow width peak.

Next, the width_threshold function 520 attempts to identify the wide width peak in the histogram (see step 1114). It does so by advancing the pointer BAR_GAP_SIZE entries and then advancing the HIST_MOVING_AVERAGE window until detecting a peak of wide width entries. Detection of the wide width peak is similar to detection of the narrow width peak.

If either the narrow or the wide width peak was not found (see step 1116), then the width_threshold function 520 returns a "threshold fail" status (see step 1118). Otherwise, the function sets the minimum and maximum narrow and wide width thresholds as follows.

First, the width_threshold function 520 subtracts the narrow width peak from the wide width peak and divides this difference by two, thereby computing "peak_difference" (see step 1120). The function then sets the narrow width minimum threshold to the narrow width peak minus peak_difference (see step 1122), and it sets the narrow width maximum threshold to the narrow width peak plus peak_difference (see step 1124). Similarly, the width_threshold function 520 sets the wide width minimum threshold to the wide width peak minus peak_difference (see step 1126), and it sets the wide width maximum threshold to the wide width peak plus peak_difference (see step 1128).

If the narrow width minimum threshold is less than MIN_BAR, then the width_threshold function 520 sets the narrow width minimum threshold to MIN_BAR (see steps 1130 and 1132). Finally, the function returns the status "success" (see step 1134).

8. Run_Length_Decode Function

Figure 12:
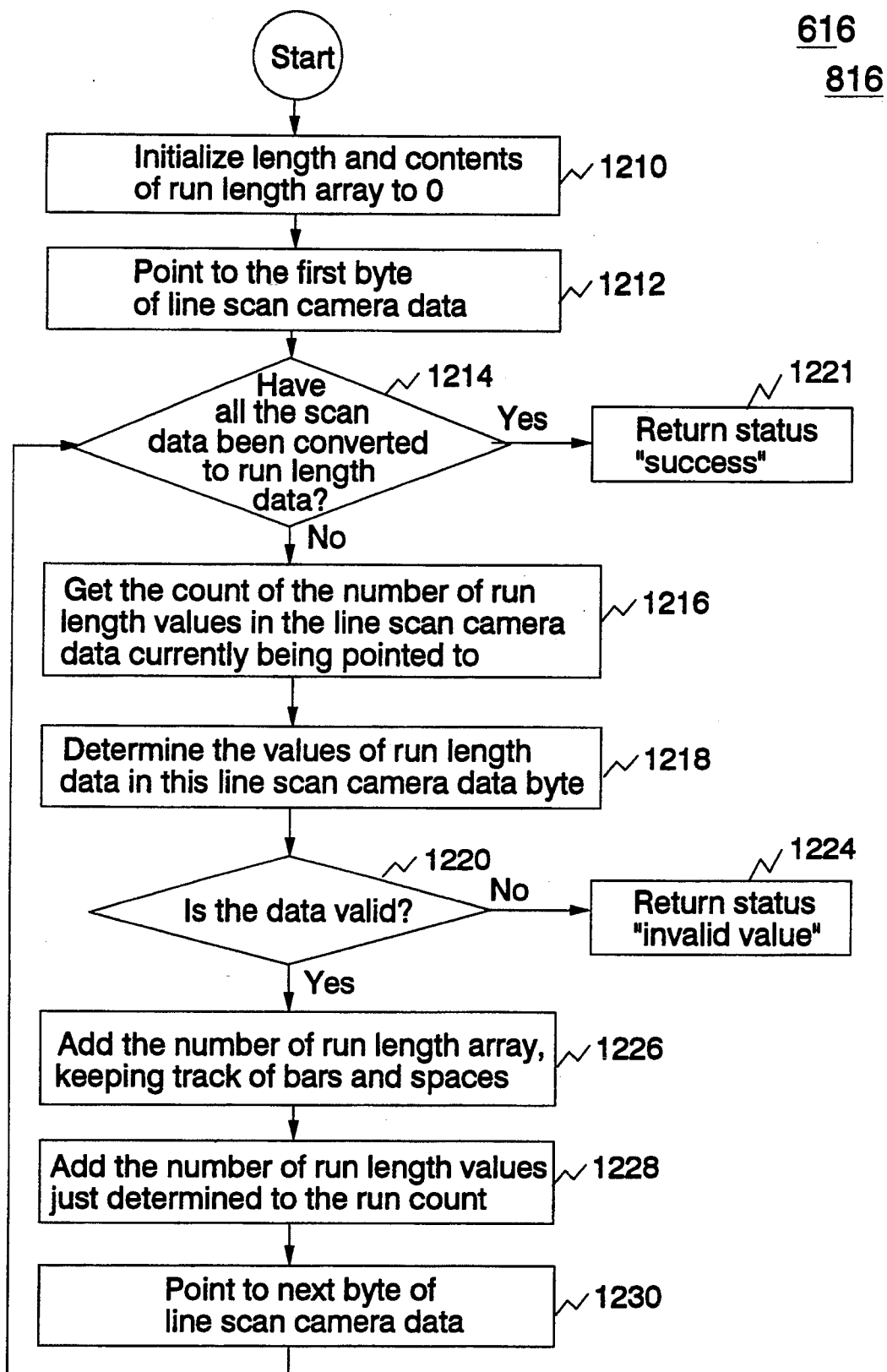
FIG. 12 shows a flowchart of the operation of a run_length_decode function of the process_line function of FIG. 5.

FIG. 12 shows a flowchart of the operation of the run_length_decode function 516. This function takes scan line data and converts it to run length data. The function presumes that one-bit drop-ins and drop-outs have been filtered from the scan line data. Input parameters to the function 5 16 are a pointer to the scan line data ("line_scan_out"), the number of bytes of scan line data ("scan_length") and the size of the array in which the run length data is to be stored ("sizeof_run_length"). Output parameters are an array of run length data ("run_length") and the number of values in the run length data ("run_count").

The run_length_decode function 516 begins by initializing the run_length entries and run_count to 0 (see step 1210). Next, it initializes a pointer to the first byte of line_scan_out (see step 1212). The function then enters a loop to process each byte of line_scan_out (see steps 1214–1230).

The loop proceeds as follows. At step 1214, it is determined whether all of the scan data has been converted to run length data. If it has, then the loop terminates and returns a status of "success" (see step 1221). If all scan data has not been convened, then the method proceeds to step 1216.

The run_length_decode function 516 then determines, for the current byte, the number of run length values (see step 1216), the actual run length values (see step 1218) and whether the line_scan_out data are valid for two-bit drop-outs (see step 1220). Steps 1216, 1218 and 1220 are carried out by indexing into a run_length_mask array with the current byte and an indication of whether the current byte represents a bar or a space (i.e., whether the index of the current byte is even or odd). Each location of run_length_mask contains the number of run length values and the actual run length values that correspond to its indices. A representative portion of the array follows, in which entries for spaces are on the left and entries for bars are on the right.

```
char run_length_mask[256][2][6] = {
/* 0x0000 */
1, 0, 8, 0, 0, 0,     0, 8, 0, 0, 0, 0,
/* 0x0001 */
2, 0, 7, 1, 0, 0,     1, 7, 1, 0, 0, 0,
/* 0x0002 */
3, 0, 5, 1, 2, 0,     2, 6, 1, 1, 0, 0,
/* 0x0003 */
2, 0, 6, 2, 0, 0,     1, 6, 2, 0, 0, 0,
/* 0x0004 */
3, 0, 5, 1, 2, 0,     2, 5, 1, 2, 0, 0,
/* 0x0005 */
4, 0, 5, 1, 1, 1,     3, 5, 1, 1, 1, 0,
/* 0x0006 */
3, 0, 5, 2, 1, 0,     2, 5, 2, 1, 0, 0,
/* 0x0007 */
2, 0, 5, 3, 0, 0,     1, 5, 3, 0, 0, 0,
```

```
                  -continued
/* 0x0008 */
3,  0, 4, 1, 3, 0,        2,  4, 1, 3, 0, 0,
/* 0x0009 */
4,  0, 4, 1, 2, 1,        3,  4, 1, 2, 1, 0,
/* 0x000a */
-1, 0, 0, 0, 0, 0,        4,  4, 1, 1, 1, 1,
...
/* 0x00ff */
0,  8, 0, 0, 0, 0,        1,  0, 8, 0, 0, 0,
};
```

Next, the run_length_decode function 516 determines whether the data is valid (see step 1220). If the data is not valid, then a status "invalid value" is returned (see step 1224). If the data is valid, then the values of the run length data are added to the run_length (see step 1226). The number of run length values are added to run_count at step 1228. Finally, the pointer is set to the next byte of line_scan_out (see step 1230) and the loop is repeated by returning to step 1214.

9. Find_Char Function

The find_char function 522 searches for a character in the run length data. It receives as input parameters the set of characters to search for ("valid_start_chars"), the number of characters in valid_start_char, the direction for the search ("direction"), a pointer to the run_length array, the length of run_length and the wide and narrow width thresholds. Output parameters of the function are the position in valid_start_chars of the character found ("char_found"), the byte in the scan data on which the character starts ("char_start") and the byte in the scan data on which the character ends ("char_end").

Figure 13:
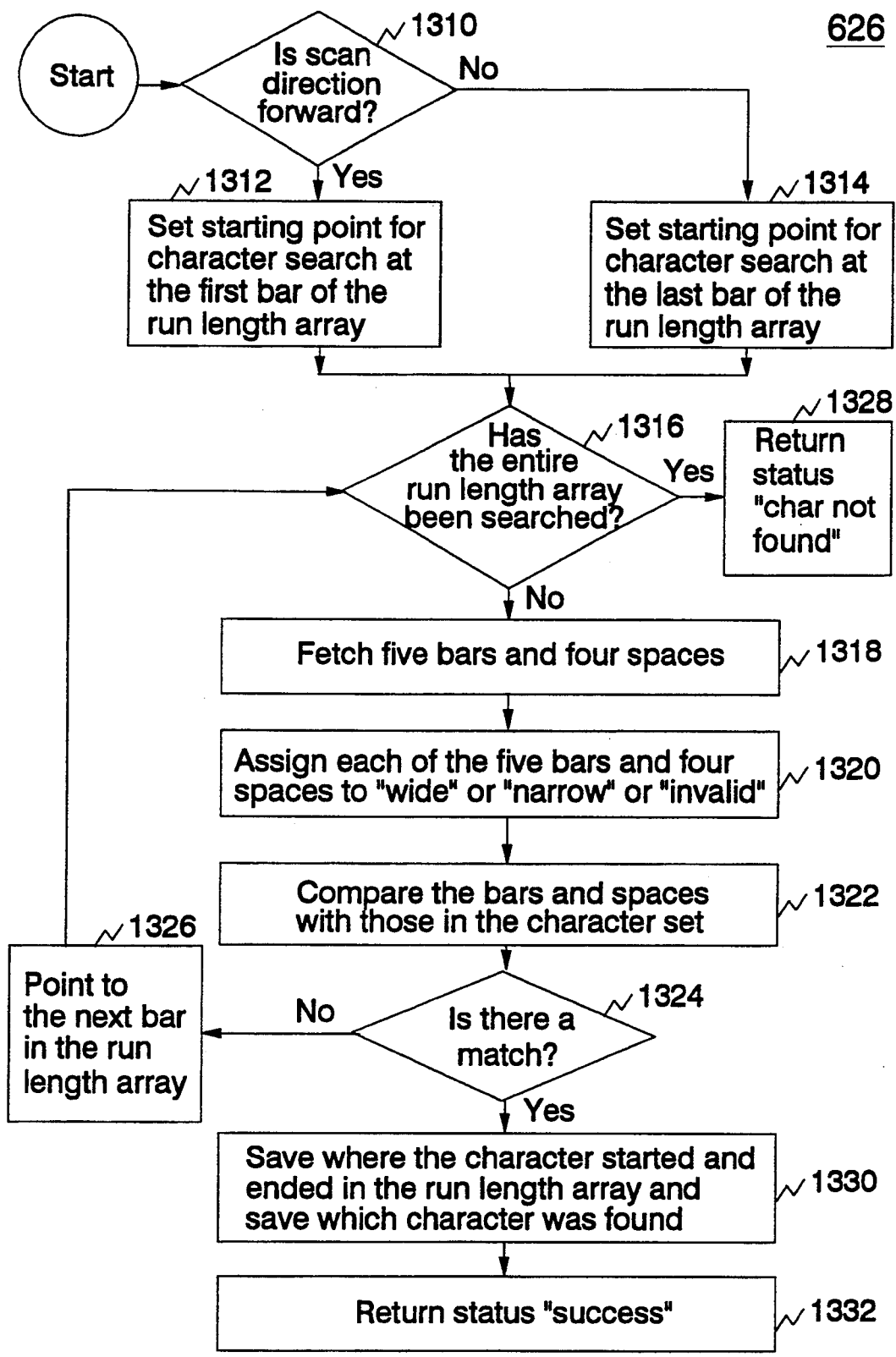
FIG. 13 shows a flowchart of the operation of a fin_d_char function of the process_line function of FIG. 5.

FIG. 13 shows a flowchart of the operation of the find_char function 522. The function begins by determining whether the scan direction is forward (see step 1310). If so, then it sets the starting point for character search to the first position of the run_length (see step 1312), and it will process run_length from left to right. Otherwise, it sets the starting point for character search to the last position of run_length (see step 1314), and it will process run_length from right to left.

The find_char function 522 then searches run_length for a character in valid_start_chars as follows. It first fetches the next five bars and four spaces from run_length (see step 1318). The five bars and four spaces correspond to the nine elements of a character in the 3-of-9 encoding. Next, the function assigns each of the five bars and four spaces to "wide", "narrow" or "invalid" (see step 1320). The bars and spaces are classified according to the wide and narrow minimum and maximum width thresholds determined by the width_threshold function.

The find_char function 522 then determines whether the five-bar, four-space sequence matches that of any of the characters in the character set (see step 1322). If not, then the find_char function advances a run_length pointer to the next bar (see step 1326). If there is a five bar, four space sequence beginning with that bar, then the function repeats steps 13 18 through 1324 (see step 1316). Otherwise, the function returns the status "char_not_found" (see step 1328).

If, on the other hand, a match was found in step 1324, then the find_char function 522 sets char_start to the current value of the run_length pointer and char_end to the end of the current five-bar, four-space sequence. The function sets number_of_char to the position in valid_start_chars where the character was found. (See step 1330.) This information will be used when building a composite line 1918 starting with or ending with this character. Finally, the function returns the status "success" (see step 1332).

10. Run_Length_Filter Function

The run_length_filter function 518 removes drop-outs and drop-ins having a width of between two and an error_width number of pixels from the run length data. Input parameters to the function 518 are a pointer to the run_length array, the number of values in run_length, and the size of the drop-outs and drop-ins to be filtered (error_width). Output parameters are the filtered run_length array and the number of values in the filtered run_length array.

The function operates essentially as follows. It removes from the run length data any space which is between two and an error_width number of pixels wide by adding the width of the space to the width of the next bar plus the width of the previous bar. The function removes all bars that are between two and an error_width number of pixels wide by adding the width of the bar to the width of the next space plus the width of the previous space. The function distinguishes bars from spaces based on the positions in run_length. The values in even positions are spaces, and those in odd positions are bars. If the filtered run_length array ends with a bar, then the function appends to the array a zero pixel wide space so as to ensure that the filtered run_length array ends with a space.

Figure 14A:
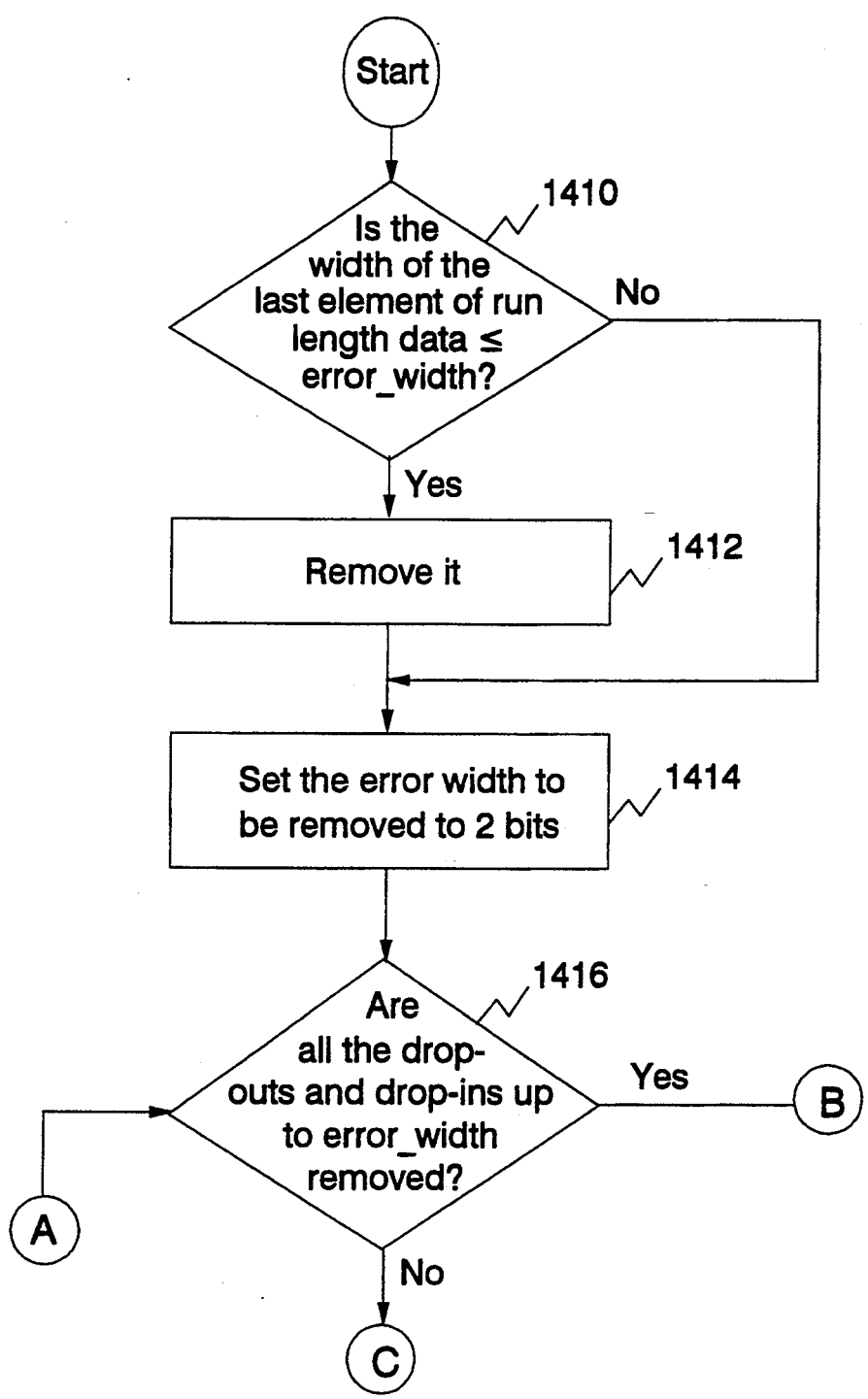
FIGS. 14A and 14B show a flowchart of the operation of a run_length_filter function of the process_line function of FIG. 5.
Figure 14B:
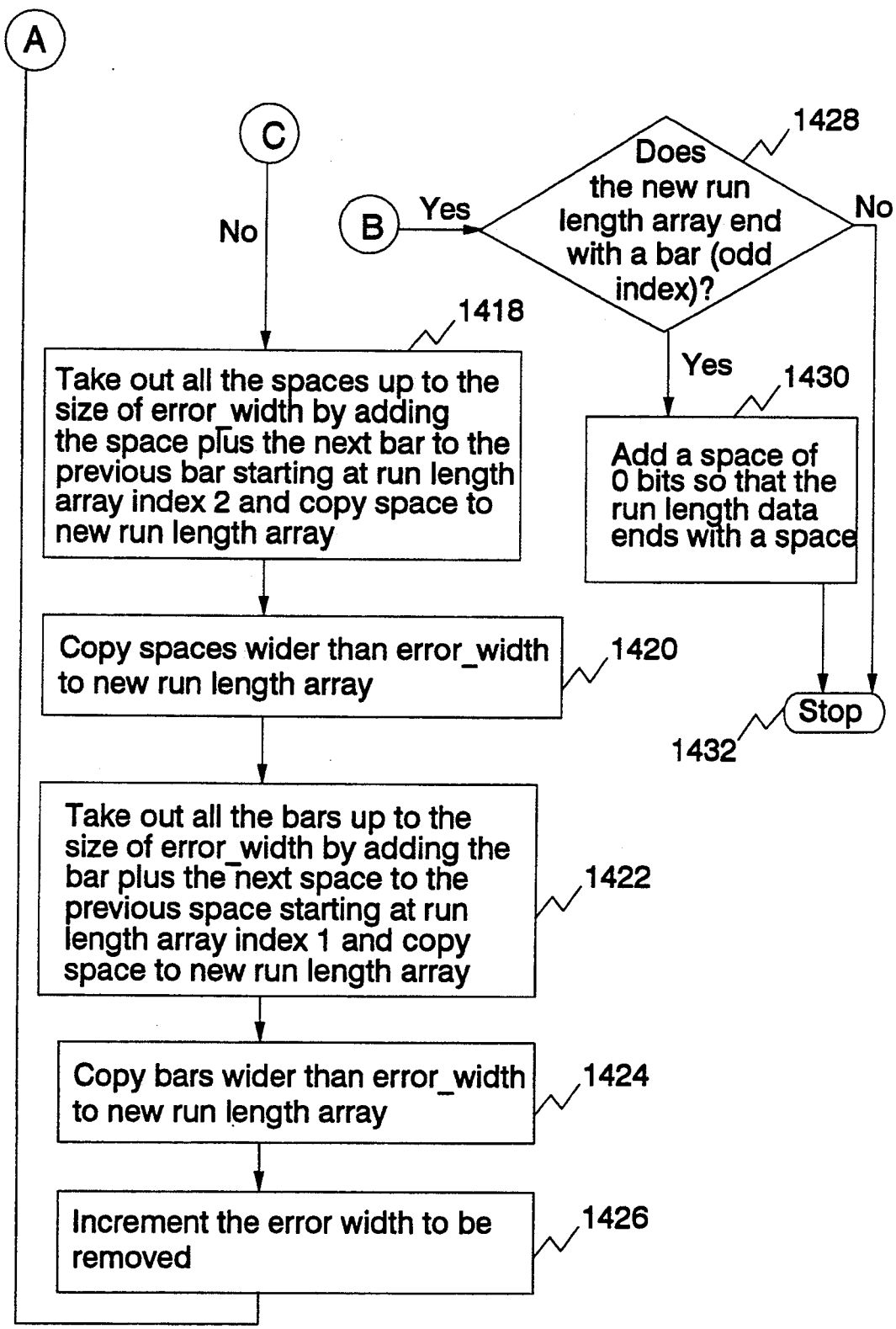

FIGS. 14A and 14B show a flowchart of the operation of the run_length_filter function 518. The function first determines whether the space at the end of run_length has a width of less than an error_width number of pixels (see step 1410). If so, then the function adds the width of the space to the width of the bar preceding it (see step 1412). Next, the function initializes a variable called "current_error" to 2 (see step 1414).

Then, for each value of error between two and error_width, the run_length_filter function 518 processes the run length data as follows (see step 1416). First, the function removes from run_length any "error space width", i.e., any space narrower than current_error, by adding the width of the space to the width of the bar following it plus the width of the bar preceding it and copies the newly created bar to the filtered run_length array (see step 1418). Next, the function copies any space wider than error_width to the filtered run_length array (see step 1420).

The run_length_filter function 518 then removes from run_length any "error bar width", i.e., any bar narrower than current_error by adding the width of the bar to the width of the space following it plus the width of the space preceding it and copies the newly created space to the filtered run_length array (see step 1422). Next, the function copies any bar wider than error_width to the filtered run_length array (see step 1424).

The run_length_filter function 5 18 then increments current_error (see step 1426). If current_error is less than error_width (see step 1416), then steps 1418-1426 are repeated to remove spaces and bars having a width of current_error. Otherwise, the function determines whether the filtered run_length array ends with a bar (see step 1428). If so, the function appends a space having a width of zero pixels, thereby ensuring that the filtered run length data ends with a space (see step 1430).

11. Convert_Bars_And_Spaces Function

The convert_bars_and_spaces function 7 12 builds a bar and space array from the run_length array. Input parameters to the function 712 are a pointer to run_length, the size of the bar and space array ("size_bars"), the number of values in the run length data ("run_count") and the minimum and maximum narrow and wide width thresholds. The output parameter of the function is a pointer to the bar and space array called "bars".

Figure 15:
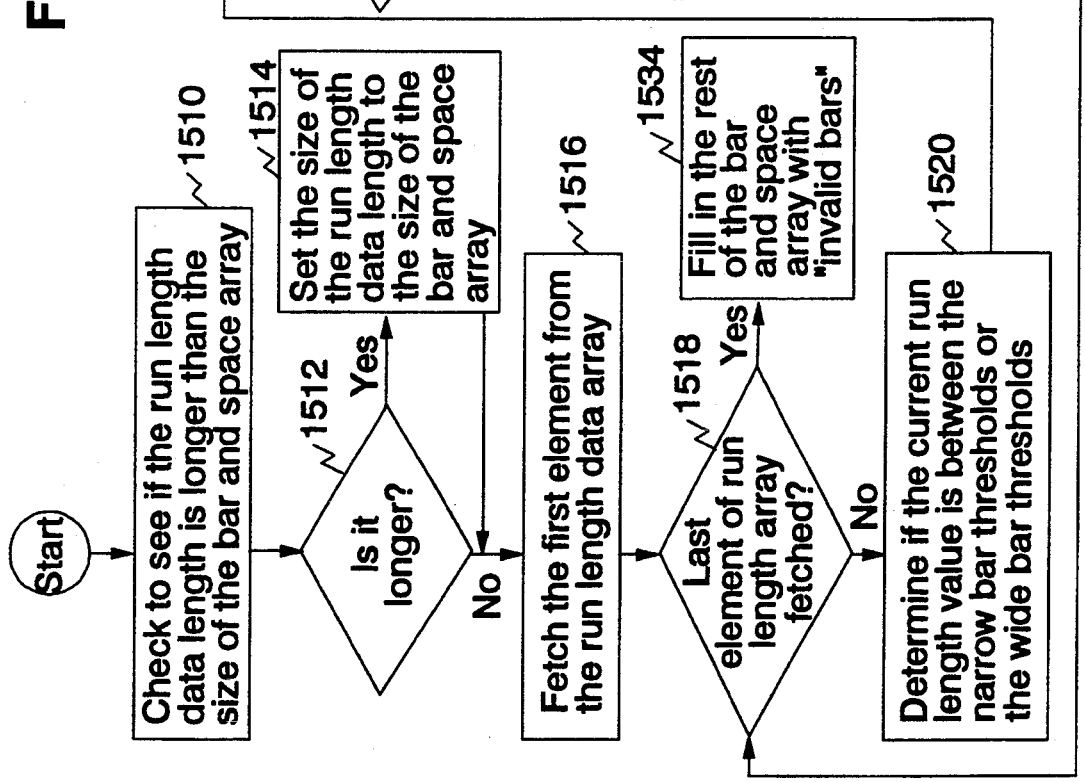
FIG. 15 shows a flowchart of the operation of a convert_bars_and_spaces function of the build_bar_label function of FIG. 7.

FIG. 15 shows a flowchart of the operation of the convert_bars_and_spaces function 712. The function begins by determining whether run_count is greater than size_bars (see step 1510). If so (see step 1512), run_length is truncated by setting run_count to size_bars (see step 1514). A run_length pointer is then set to point to the first element in run_length (see step 1516).

Each element of run_length is then processed as follows. First, the convert_bars_and_spaces function compares the element pointed to by the current value of the run_length pointer to the narrow and wide width thresholds (see step 1520). If the value is between the minimum and maximum wide width thresholds (see step 1522), then the function inserts a value that indicates "wide" into the bar and space array (see step 1524).

If, on the other hand, the value is between the minimum and maximum narrow width thresholds (see step 1526), then the function inserts a value that indicates "narrow" into the bar and space array (see step 1528). If the value does not fall between the thresholds for narrow or wide widths, then the function inserts a value that indicates "invalid" into the bar and space array (see step 1530). The function then advances the run_length array (see step 1532).

Finally, once all elements of run_length have been processed (see step 1518), the convert_bars_and_spaces function 712 pads any remaining positions in the bar and space array with "invalid" (see step 1534).

12. Build_Bar_Code Function

The build_bar_code function 716 decodes the bar and space army into ASCII characters. It does so essentially by partitioning the bar and space array in a forward direction (i.e., from left to right) to generate forward-oriented width value sequences and attempting to decode each forward-oriented width value sequence into an ASCII code. If the decoding is unsuccessful, then the function partitions the bar and space array in a backward direction (i.e., from right to left) to generate backward-oriented width value sequences and, attempts to decode each backward-oriented width value sequence.

Input parameters to the build_bar_code function 716 are a pointer to the bar and space array, the number of bars and spaces in the bar and space array and the direction in which the bar and space array is to be decoded. The output parameter is an array of the decoded ASCII characters called "bar_label". The function returns a status of "readable" if the bar and space array was completely translatable to ASCII characters. If any character in the bar and space array was not readable, then the function returns a status "unreadable".

Figure 16:
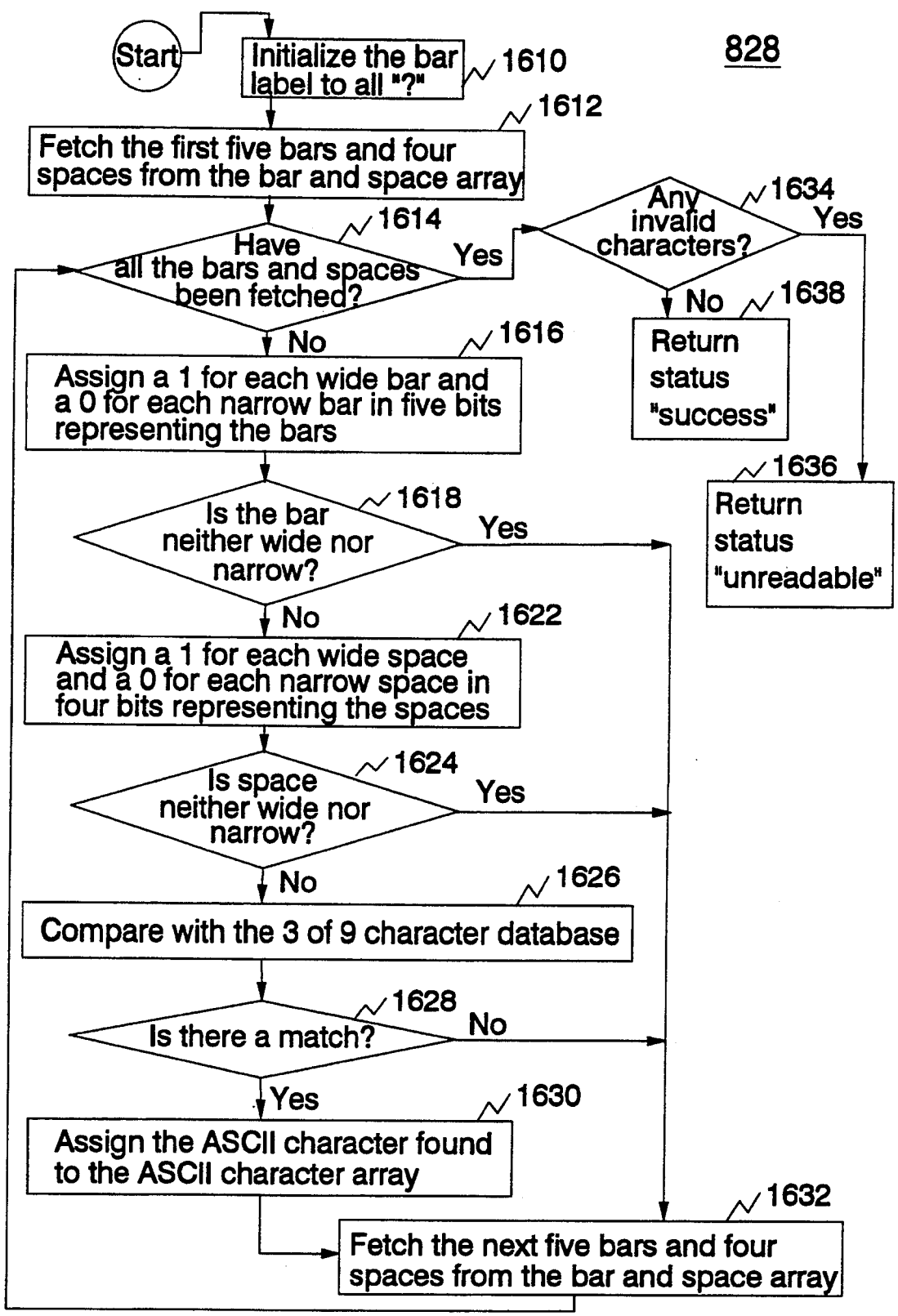
FIG. 16 shows a flowchart of the operation of a build_bar_code function of the build_bar_label function of FIG. 7.

FIG. 16 shows a flowchart of the operation of the build_bar_code function 716. The function begins by initializing bar_label to all "?" (see step 1610). It then fetches the first 9 elements (i.e., the first five bars and four spaces) of the bar and space array (see step 1612).

Each five-bar, four-space sequence in the bar and space array corresponds to the nine elements in a three-of-nine encoded character.

The build_bar_code function 716 processes each five-bar, four-space sequence in the bar and space array as follows. First, it sets five bits of "bar code.bar" (i.e., the "bar" field of a structure called "bar code" to indicate the width (wide or narrow) of each of the five current bars (see step 1616). If any such bar was found invalid by convert_bars_and_spaces function 712 (see step 1618), then the current element of bar_label remains "?".

Otherwise, the build_bar_code function 716 then sets four bits of "bar code.space" (i.e., the "space" field of bar code) to indicate the width of each of the four current spaces (see step 1622). If any such space was neither wide nor narrow (see step 1624), then the current element of bar_label remains "?".

If all bars and spaces were either wide or narrow, then the build_bar_code function 716 attempts to match the 5 bar, 4 space sequence to an entry in a "3of9-database" array (see step 1626). The 3of9database array is a two-dimensional array indexed by the five bars of a nine-element encoded character in one axis and by the four spaces of the encoded character in the other. The build_bar_code function 716 thus addresses the array with bar code.bar and bar_label.space. Each position of the array contains the character (which could be invalid) associated with its address.

If the character addressed by bar code.bar and bar code.space is valid (see step 1628), then the build_bar_code function 716 sets the current element of bar_label to that character (see step 1630). Otherwise, the current element remains "?".

The build_bar_label function 716 then attempts to fetch the next five bar, four space sequence (see step 1632) and carry out steps 1616–1632 on it. Once all 5 bar 4 space sequences have been processed, the function determines whether any characters in bar_label remain "?" (see step 1634). If so, the function returns the status "unreadable" (see step 1636). Otherwise, it returns the status "success" (see step 1638).

13. Vote_Bars_And_Spaces Function

The vote_bars_and_spaces function 714 compares corresponding elements of three input bar and space arrays to generate a single output bar and space array. Input parameters to the function 714 are the three bar and space arrays, the number of bars and spaces to compare and the direction in which the arrays are to be analyzed. The output parameter is the new bar and space array.

Figure 17:
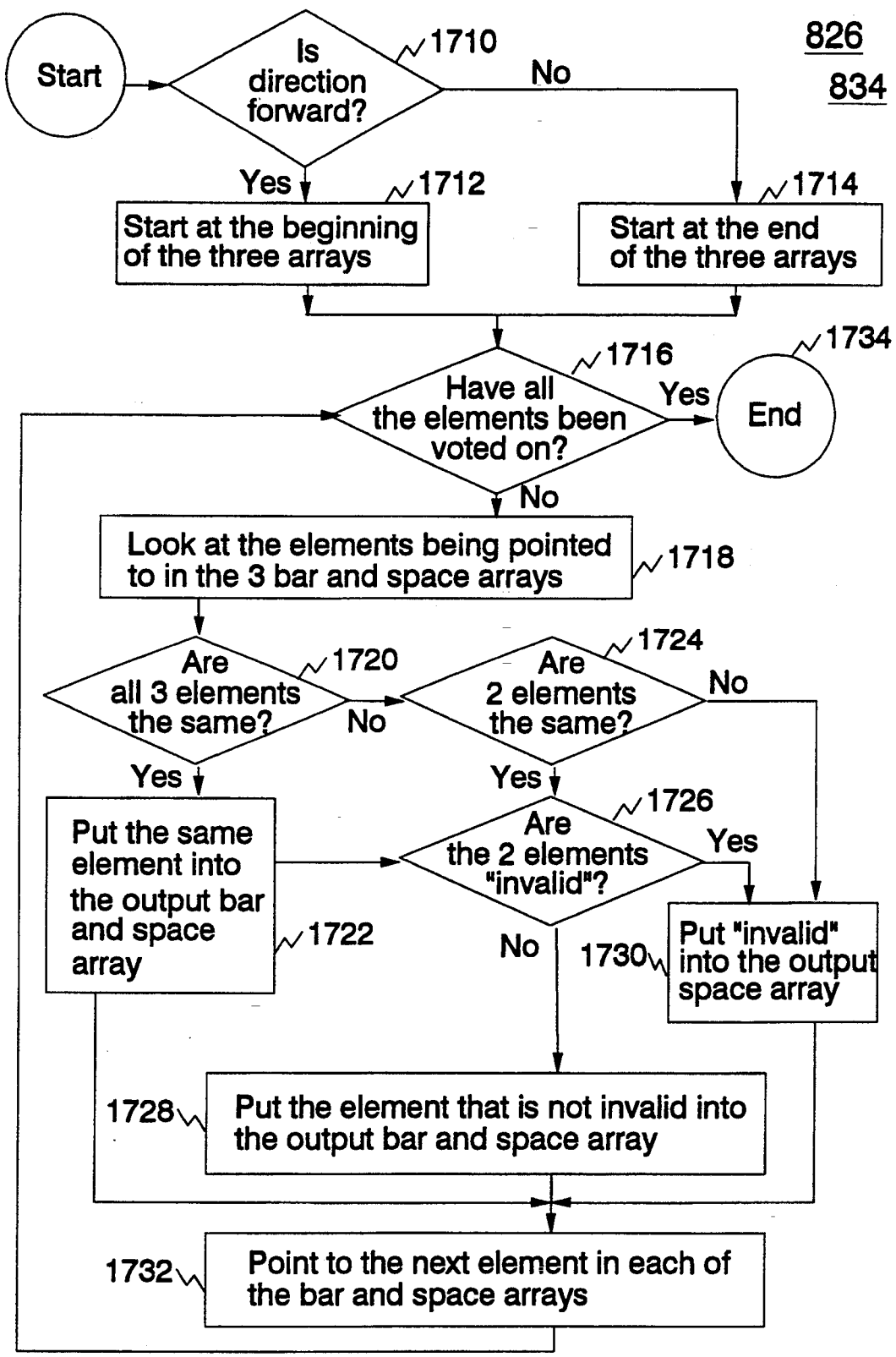
FIG. 17 shows a flowchart of the operation of the vote_bars_and_spaces function of the build_bar_label function of FIG. 7.

FIG. 17 shows a flowchart of the operation of the vote_bars_and_spaces function 714. The function begins by determining whether the direction in which to analyze the input arrays is forward (see step 1710). If so, it sets a pointer to first position of the three arrays, and it will analyze their values from left to right (see step 1712). Otherwise, the function sets the pointer to the last position of the three arrays, and it will analyze the array values from right to left (see step 1714).

The vote_bars_and_spaces function 714 then votes on corresponding elements of the three arrays as follows. First, the function compares the three elements at the current position of the input bar and space arrays (see step 1718). If all three elements are the same (see step 1720), then the function inserts the common value into the current position of the output bar and space array (see step 1722).

If two of the three array elements are the same (see step 1724), and if the common value is a valid character (see step 1726), then the function inserts that character into the current position of the output bar and space array (see step 1728). If the common value is an invalid character, or if all three elements are different, then the function inserts a "?" into the current position of the output bar and space array to represent an invalid character (see step 1730). Next, the current array position is advanced (see step 1732).

Alternatively, the vote_bars_and_spaces function 714 can be designed so that if two or all of the corresponding characters match, the matching character is inserted into the output array, even if the matching character is invalid.

Steps 1718-1732 are then repeated for each additional set of three array elements (see step 17 16). The vote_bars_and_spaces function 714 terminates once all of the array elements have been processed (see step 1734).

14. Build_Composite Function

The build_composite function 710 builds a composite scan line ("line_scan_in") from a scan line having a start character and a scan line having an end character. Input parameters to the function 710 are the line_scan_camera_data, the length of a scan ("length"), the scan line containing the start character ("starting_line"), the scan line containing the end character ("ending_line"), the position in which to start the composite line 1918 ("starting_byte") and the position in which to end the composite line 1918 ("ending_byte"). The output parameters are the composite line 1918 ("line_scan_in") and the length of the composite scan ("scan_length").

Figure 18A:
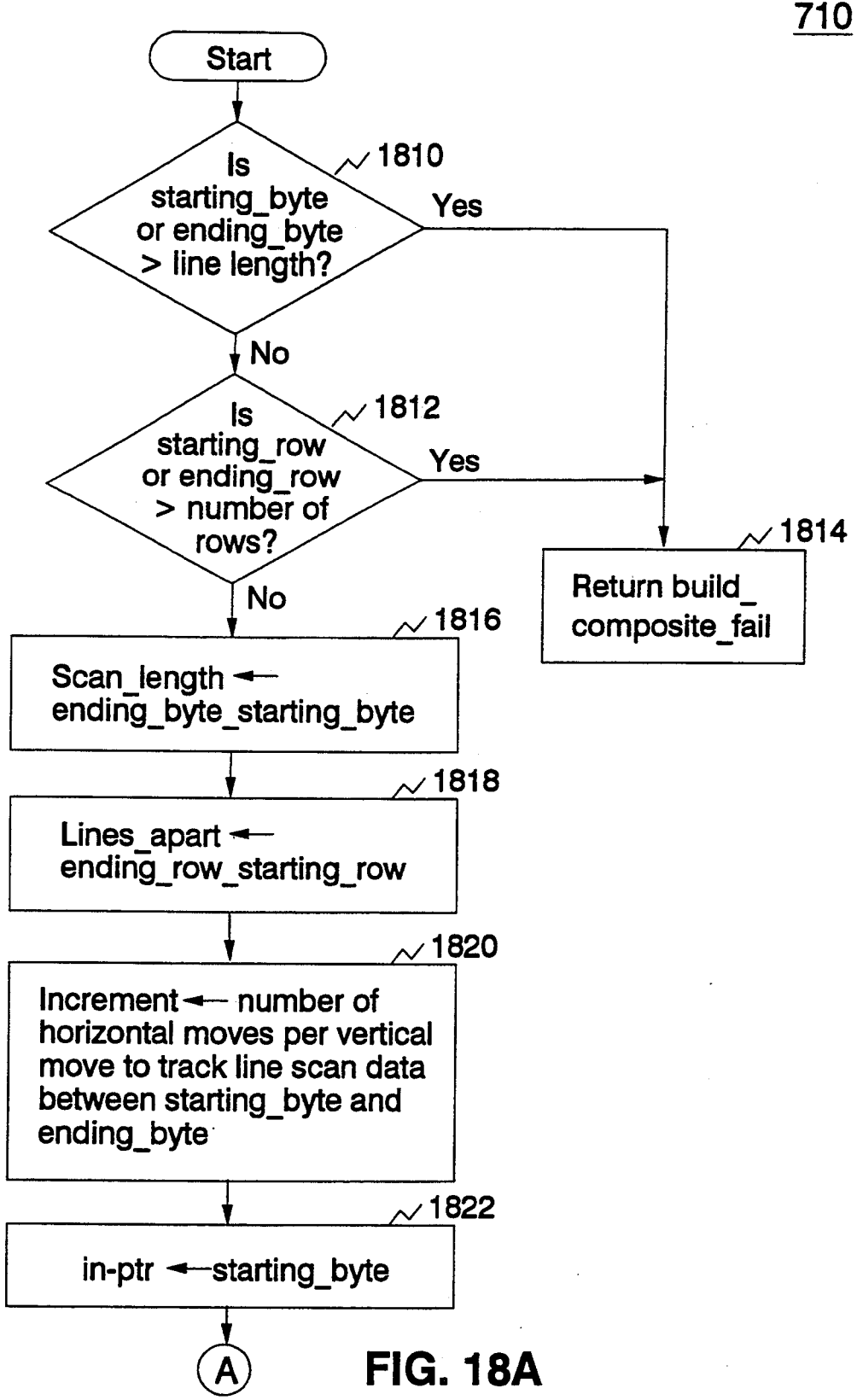
FIGS. 18A and 18B show a flowchart of the operation of a build_composite function of the build_bar_label function of FIG. 7.
Figure 18B:
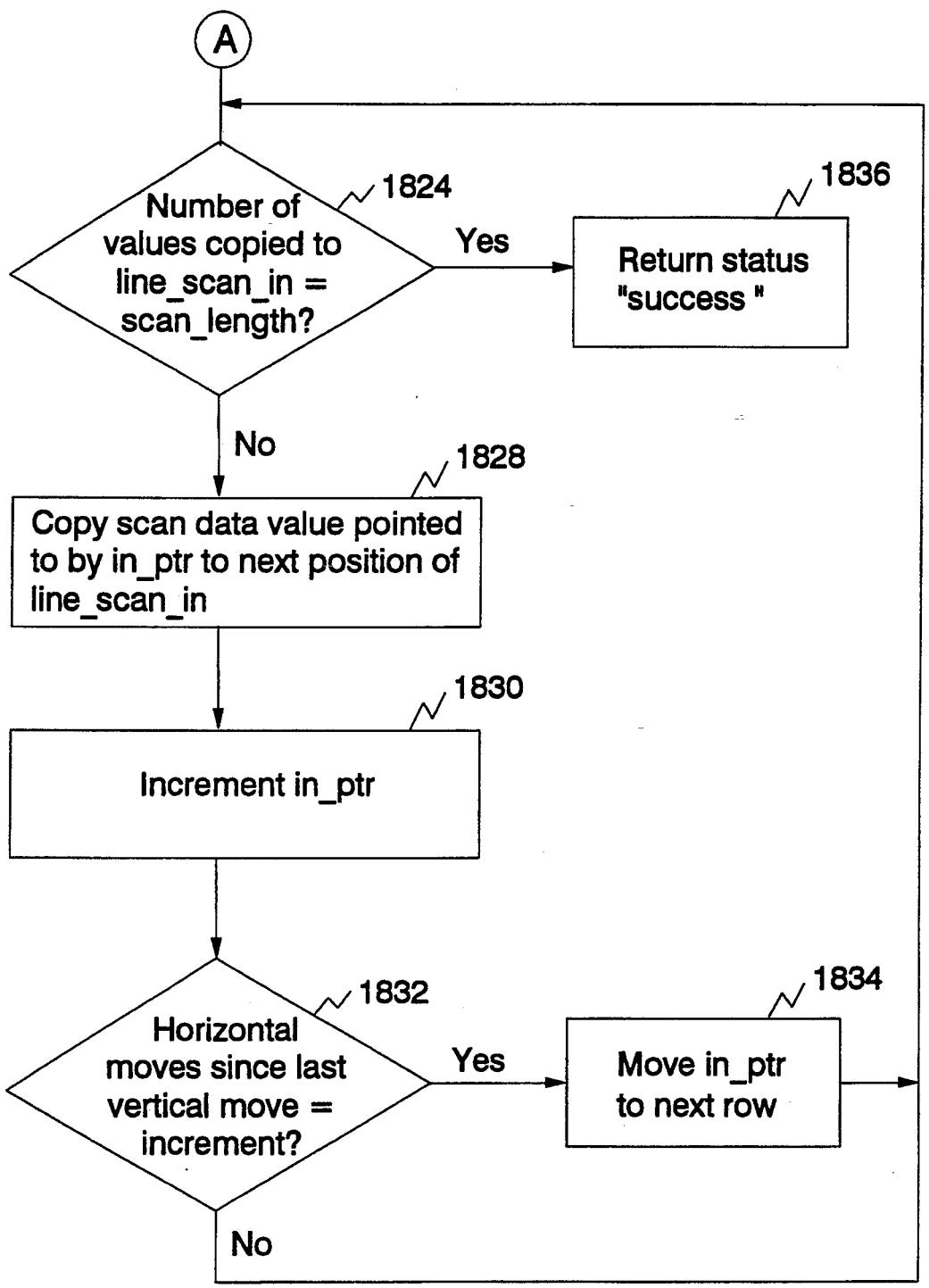

FIGS. 18A and 18B show a flowchart of the operation of the build_composite function 710. Referring to FIG. 18A, the function first performs error checking. Specifically, if starting_byte or ending_byte is greater than the length of a scan (see step 1810), or if starting_line or ending_line is greater than the number of lines in the scan data (see step 1812), then the function returns the status "build_composite_fail" (see step 1814).

The build_composite function 710 then determines the length of the composite line 1918 ("scan_length") by subtracting starting_byte from ending_byte (see step 1816). The function 710 determines the number of lines between the scan line containing the start character and the scan line containing the end character ("lines_apart") by subtracting starting_line from ending_line (see step 1818). Note that if ending_line is above starting_line, then lines_apart is negative.

Next, the build_composite function 710 sets "increment" to the ratio of scan_length to lines_apart or, if lines_apart is zero, to a value greater than scan_length (see step 1820). The value of increment indicates the number of pixels to copy from each line between starting_line and ending_line. The current position of the current line in the line scan data is pointed to by "in_ptr". The value of in_ptr is initialized to starting_byte (see step 1822).

Referring to FIG. 18B, the build_composite function 710 then enters a loop in which the appropriate values of the line scan data are inserted in line_scan_in as follows. First, the value in the line scan data pointed to by in_ptr is copied to the next position in line_scan_in (see step 1828). The value of in_ptr is then incremented to point to the next position in the current line (see step 1830). Then, if the number of values copied from the current line equals increment (see step 1832), then in_ptr is moved to the current position in the next line (see step 1834). If lines_apart is a positive number, then the moving is accomplished by adding the length of a scan to in_ptr. If lines_apart is negative, the length of a scan is subtracted from in_ptr.

Steps 1828-1834 are repeated until scan_length values have been copied to line_scan_in (see step 1824). The build_composite function 710 then returns the status "success" (see step 1836).

Conclusion

While various embodiments of the present invention have been described above, it should be understood that they have been presented by way of example only. Thus, the breadth and scope of the present invention should not be limited by any of the above-described exemplary embodiments, but should be defined only in accordance with the following claims and their equivalents.

What is claimed is:

1. A system for converting a bar code to a machine-interpretable code comprising:
   scan data capturing means for simultaneously capturing a plurality of substantially parallel lines of scan data representative of the bar code;
   locating means for searching pixels of said scan data in a specified direction to locate a specified pixel sequence;
   start character locating means for invoking said locating means to search said scan data in a first direction for a predefined start sequence, wherein said start sequence begins at a start position in a starting line of said scan data;
   end character locating means for invoking said locating means to search said scan data in a second direction for a predefined end sequence, wherein said end sequence ends at an end position in an ending line of said scan data;
   composite line building means for selecting pixel values of said scan data in positions between said start position and said ending position, if said start sequence and said end sequence are found within said scan data, and inserting said pixel values in an array to form a composite line;
   conversion means for converting said composite line into a bar and space array of width values; and
   bar label building means for decoding said bar and space array into the machine interpretable code.

2. The system of claim 1, wherein said scan data capturing means comprises:
   an optical scanner that generates said scan data; and
   a buffer that stores the scan data.

3. The system of claim 1, wherein said composite line building means comprises:
   means for setting a pointer to said start position;
   copying means for copying a value in a pointed-to position of a current line of said scan data to said composite line, wherein said pointed-to position is indicated by said pointer;
   horizontal moving means for advancing said pointer to an adjacent position in said current line;
   vertical moving means for advancing said pointer one line closer to said ending line of the number of values copied from said current line to said composite line is equal to a ratio of a number of pixels in each of said scan lines to a number of lines between said starting line and said ending line including both said starting line and said ending line; and means for repeatedly invoking said copying means, said horizontal moving means and said vertical moving means to form said composite line.

4. The system of claim 1, wherein said conversion means comprises:
    means for generating a run length array of bar and space widths, wherein each bar and space width is equal to the number of pixels in said composite line that represent a bar or a space; and
    width threshold determining means for classifying said bar and space width values as either narrow or wide.

5. The system of claim 4, wherein said width threshold determining means comprises:
    means for generating a histogram having histogram values, wherein each histogram value indicates the number of bars or spaces of a particular width;
    means for identifying, in said histogram, a first peak of narrow bar and space widths and a second peak of wide bar and space widths; and
    means for classifying said bar and space widths, wherein each bar and space width which falls within said first peak is classified as narrow and each bar and space width which falls within said second peak is classified as wide.

6. The system of claim 4, wherein said conversion means further comprises:
    means for identifying an error bar width in said bar and space array, wherein said error bar width is less than a specified error width;
    means for adding said error bar width and a first adjacent space width to a second adjacent space width;
    means for identifying an error space width in said bar and space array, wherein said error space width is less than a specified error width; and
    means for adding said error space width and a first adjacent bar width to a second adjacent bar width.

7. The system of claim 1, wherein said bar label building means comprises means for identifying a machine-interpretable value associated with a bar and space sequence of said width values in said bar and space array.

8. The system of claim 7, wherein said bar label building means further comprises:
    partitioning means for partitioning said bar and space array in a specified direction to generate width value sequences of a specified length;
    decoding means for decoding width value sequences into machine-interpretable values;
    first bar label building means for invoking said partitioning means to partition said bar and space array in a first direction and generating first-oriented width value sequences;
    means for invoking said decoding means to decode said first-oriented width value sequences;
    second bar label building means for invoking said partitioning means to partition said bar and space array in a second direction and generate second-oriented width value sequences, if said decoding means could not decode said first-oriented width value sequences; and
    means for invoking said decoding means to decode said second-oriented width value sequences if said decoding means could not decode said first-oriented width value sequences.

9. The system of claim 1, further comprising one-bit filtering means for changing any pixel value that is different from both an immediately preceding pixel value in a line of said scan data and an immediately following pixel value in said line of said scan data.

10. The system of claim 1, further comprising:
    means for repeatedly invoking said start character locating means, said end character locating means, said composite line building means and said conversion means to generate a plurality of bar and space arrays; and
    voting means for voting across corresponding width values in said plurality of bar and space arrays to generate an optimal bar and space array.

11. The system of claim 10, wherein said voting means comprises means for determining whether a majority of said corresponding width values are equal and, if so, inserting said majority width value into said optimal bar and space array.

12. The system of claim 1, further comprising means for unscrambling said machine interpretable code according to an order indicated by said start sequence.

13. A method for converting a bar code to a machine-interpretable code comprising the steps of:
    (1) capturing a plurality of substantially parallel lines of scan data representative of the bar code;
    (2) searching pixels of said scan data in a first direction to locate a predefined start sequence, wherein said start sequence begins at a start position in a starting line of said scan data;
    (3) searching pixels of said scan data in a second direction to locate a predefined end sequence, wherein said end sequence ends at an end position in an ending line of said scan data;
    (4) selecting composite pixel values of said scan data in positions between said start position and said end position, if said start sequence and said end sequence are found within said scan data, and inserting said composite pixel values into an array to form a composite line;
    (5) converting said composite line into a bar and space array of width values; and
    (6) decoding said bar and space array to generate the machine interpretable code.

14. The method of claim 13, wherein step (1) comprises the steps of:
    (a) optically scanning a bar code label to generate said scan data; and
    (b) storing said scan data in a buffer.

15. The method of claim 13, wherein step (4) comprises the steps of:
    (a) setting a pointer to said start position;
    (b) copying a value in a pointed-to position of a current line of said scan data to said composite line, wherein said pointed-to position is indicated by said pointer;
    (c) advancing said pointer in said current line one position closer to said end position;
    (d) advancing said pointer one line close to said ending line of the number of values copied from said current line to said composite line is equal to a ratio of a number of pixels in each of said scan lines to a number of lines between said starting line and said ending line including both said starting line and said ending line; and
    (e) repeating steps (b)-(d) as required to form said composite line.

16. The method of claim 13, wherein step (5) comprises the steps of:

(a) determining bar and space widths of said composite line, wherein each bar and space width is equal to the number of pixels in said composite line that represent a bar or a space;
(b) classifying said bar and space widths as either narrow or wide; and
(c) inserting said width values into said bar and space array.

17. The method of claim 16, wherein step (5)(b) comprises the steps of:
  (i) plotting a histogram having histogram values, wherein each histogram value indicates the number of bars or spaces of a particular width;
  (ii) forming a window on the histogram, wherein a predetermined number of said histogram values are within said window;
  (iii) determining the sum of said histogram values that are within said window;
  (iv) advancing said window by one position in said histogram;
  (v) repeating steps (5)(b)(iii) and (5)(b)(iv) to identify a first peak of narrow bar and space widths and a second peak of wide bar and space widths;
  (vi) classifying each said bar and space width which falls within said first peak as narrow; and
  (vii) classifying each said bar and space width which falls within said second peak as wide.

18. The method of claim 16, wherein step (5) further comprises the steps of:
  (d) identifying an error bar width in said bar and space array, wherein said error bar width is less than a specified error width;
  (e) adding said error bar width and a first adjacent space width to a second adjacent space width;
  (f) identifying an error space width in said bar and space array, wherein said error space width is less than a specified error width; and
  (g) adding said error space width and a first adjacent bar width to a second adjacent bar width.

19. The method of claim 13, wherein step (6) comprises the step of identifying a machine-interpretable value associated with a width value sequence of said width values in said bar and space array.

20. The method of claim 13, wherein step (6) comprises the steps of:
  (a) partitioning the bar and space array in a first direction to generate first-oriented width value sequences of predetermined length;
  (b) identifying machine-interpretable values associated with said first-oriented width value sequences; and
  (c) if said machine-interpretable values could not be identified for said first-oriented width value sequences, then
    partitioning the bar and space array in a second direction to generate second-oriented width value sequences of said predetermined length, and
    identifying machine-interpretable values associated with said second-oriented width value sequences.

21. The method of claim 13, further comprising the step of changing any pixel value that is different from both an immediately preceding pixel value in a line of said scan data and an immediately following pixel value in said line of said scan data.

22. The method of claim 13, further comprising:
  (7) repeating steps (2)–(5) to generate a plurality of bar and space arrays; and
  (8) voting across corresponding width values in said plurality of bar and space arrays to generate an optimal bar and space array.

23. The method of claim 22, wherein step (8) comprises the step of determining whether a majority of said corresponding width values are equal and, if so, inserting said majority width value into said optimal bar and space array.

24. The method of claim 13, further comprising the step of rearranging machine interpretable values in the machine interpretable code according to an order indicated by said start sequence.

* * * * *